United States Patent
Jovicic

(10) Patent No.: US 10,128,948 B2
(45) Date of Patent: Nov. 13, 2018

(54) METHOD AND APPARATUS FOR TRANSMITTING SECURE VLC IDENTIFIERS

(71) Applicant: QUALCOMM Incorporated, San Diego, CA (US)

(72) Inventor: Aleksandar Jovicic, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 15/820,072

(22) Filed: Nov. 21, 2017

(65) Prior Publication Data
US 2018/0083704 A1 Mar. 22, 2018

Related U.S. Application Data

(62) Division of application No. 14/830,535, filed on Aug. 19, 2015.
(Continued)

(51) Int. Cl.
*H04B 10/00* (2013.01)
*H04B 10/116* (2013.01)
(Continued)

(52) U.S. Cl.
CPC ....... *H04B 10/116* (2013.01); *H04B 10/1149* (2013.01); *H04L 12/2809* (2013.01); *H04L 12/2816* (2013.01)

(58) Field of Classification Search
CPC .............. H04B 10/116; H04B 10/1143; H04B 10/1149; H04B 10/112; H04B 10/1123; H05B 37/0272; H05B 33/0845
(Continued)

(56) References Cited

U.S. PATENT DOCUMENTS 8,107,825 B2  1/2012  Rajagopal et al.
8,326,526 B2 * 12/2012  Won .................. G01C 21/20
                                                    701/410
(Continued)

FOREIGN PATENT DOCUMENTS

CN        102780695 B    12/2014

OTHER PUBLICATIONS

International Search Report and Written Opinion—PCT/US2015/055362 ISA/EPO—dated Apr. 15, 2016.
(Continued)

*Primary Examiner* — Hanh Phan
(74) *Attorney, Agent, or Firm* — Arent Fox LLP

(57) ABSTRACT

In an aspect of the disclosure, a method, a computer-readable medium, and an apparatus are provided. An apparatus is for determining position using visible light. The apparatus receives positional information regarding a plurality of stationary light fixtures. The apparatus receives reset information indicating an occurrence of a reset event. The apparatus receives an identifier from a first stationary light fixture of the plurality of stationary light fixtures via visible light. The apparatus determines a position of the first stationary light fixture based on the received identifier, the received positional information and the received reset information. The positional information and the reset information are received via a wireless communication medium different from visible light.

30 Claims, 15 Drawing Sheets

Related U.S. Application Data

(60) Provisional application No. 62/084,330, filed on Nov. 25, 2014.

(51) Int. Cl.
*H04L 12/28* (2006.01)
*H04B 10/114* (2013.01)

(58) Field of Classification Search
USPC ........ 398/172, 128, 130, 115, 118, 119, 135,
398/136, 182, 183, 202, 208, 127;
315/291, 294, 312, 307, 158, 152
See application file for complete search history.

(56) References Cited

U.S. PATENT DOCUMENTS

| | | |
|---|---|---|
| 2008/0166135 A1 | 7/2008 | Ann |
| 2008/0281515 A1* | 11/2008 | Ann ................. G01C 21/20 701/434 |
| 2011/0153201 A1 | 6/2011 | Park et al. |
| 2011/0164701 A1 | 7/2011 | Nikopourdeilami et al. |
| 2011/0176803 A1 | 7/2011 | Song et al. |
| 2012/0089325 A1 | 4/2012 | Won et al. |
| 2014/0112413 A1 | 4/2014 | Ro et al. |
| 2014/0236480 A1 | 8/2014 | Kang et al. |
| 2015/0071439 A1 | 3/2015 | Liu et al. |
| 2015/0372753 A1* | 12/2015 | Jovicic ................ H04B 10/116 398/172 |
| 2016/0149640 A1 | 5/2016 | Jovicic |

OTHER PUBLICATIONS

Partial International Search Report—PCT/US2015/055362—ISA/EPO—dated Feb. 3, 2016.

* cited by examiner

|     | 302 |     |     |     | 304 |     |     |
| --- | --- | --- | --- | --- | --- | --- | --- |
| C(1) | C(2) | C(3) | C(4) |
| C(2) | C(3) | C(4) | C(1) |
| C(3) | C(4) | C(1) | C(2) |
| C(4) | C(1) | C(2) | C(3) |

|     | 312 |     |     |     | 314 |     |     |
| --- | --- | --- | --- | --- | --- | --- | --- |
| C(1) | C(3) | C(2) | C(4) |
| C(2) | C(4) | C(3) | C(1) |
| C(3) | C(1) | C(4) | C(2) |
| C(4) | C(2) | C(1) | C(3) |

METHOD AND APPARATUS FOR TRANSMITTING SECURE VLC IDENTIFIERS

CROSS-REFERENCE TO RELATED APPLICATION

This application is a divisional of U.S. patent application Ser. No. 14/830,535, entitled "METHOD AND APPARATUS FOR TRANSMITTING SECURE VLC IDENTIFIERS" and filed on Aug. 19, 2015, which claims the benefit of U.S. Provisional Application Ser. No. 62/084,330, entitled "METHOD AND APPARATUS FOR TRANSMITTING SECURE VLC IDENTIFIERS" and filed on Nov. 25, 2014, which are assigned to the assignee hereof and expressly incorporated herein by reference in their entirety.

BACKGROUND

Field

The present disclosure relates generally to devices that communicate using visible light communication (VLC), and more particularly to improving security of communications by light fixture devices that communicate information to one or more other devices using VLC.

Background

A device may transmit information wirelessly, for example, in order to provide a service. The transmitted information may be received by a second device, in order to receive the service. If the transmission of the information lacks a certain level of security, yet another device (e.g., an unauthorized device) may also receive the transmitted information. The unauthorized device may then attempt to provide the service to the second device, by using the transmitted information.

SUMMARY

In an aspect of the disclosure, a method, a computer-readable medium, and an apparatus are provided. An apparatus receives positional information regarding a plurality of stationary light fixtures. The apparatus receives reset information indicating an occurrence of a reset event. The apparatus receives an identifier from a first stationary light fixture of the plurality of stationary light fixtures via visible light. The apparatus determines a position of the first stationary light fixture based on the received identifier, the received positional information and the received reset information. The positional information and the reset information are received via a wireless communication medium different from visible light.

In another aspect of the disclosure, an apparatus communicates a reset event to the plurality of stationary light fixtures, to cause at least one stationary light fixture of the plurality of stationary light fixtures to align to a particular identifier of a respective sequence of identifiers. The apparatus increments an index in response to the communicating.

In another aspect of the disclosure, an apparatus receives reset information indicating an occurrence of a reset event. The apparatus aligns to an identifier of a sequence of identifiers in response to the receiving the reset information. The apparatus transmits a visible light signal carrying the identifier.

BRIEF DESCRIPTION OF THE DRAWINGS

FIGS. 3A and 3B illustrate codewords of a first matrix and of a second matrix, respectively.

DETAILED DESCRIPTION

Figure 1:
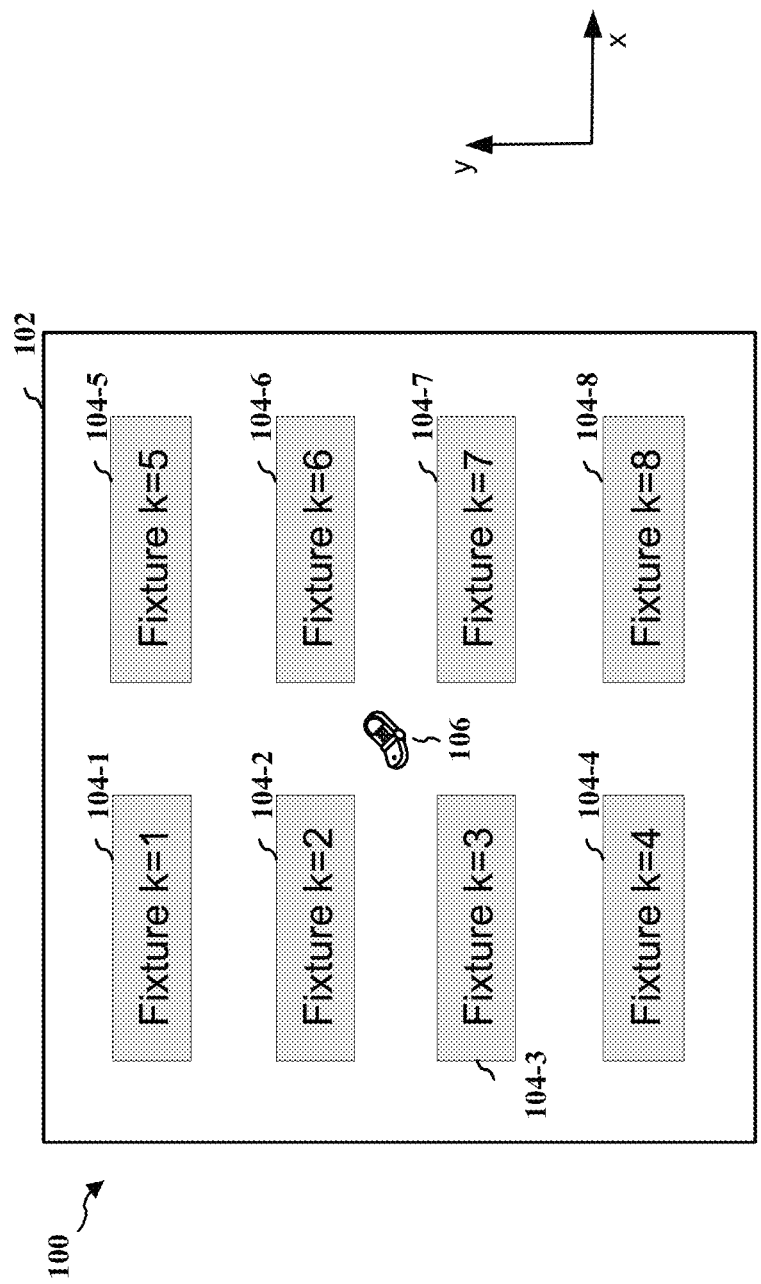
FIG. 1 illustrates a plan view of light fixtures positioned at an environment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of improving security of communications are presented below with reference to various apparatuses and methods. These apparatuses and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

According to aspects of the disclosure, information may be communicated using visible light communication (VLC). VLC communication is conducted using visible light (e.g., light having a wavelength between around 375 nm and 780 nm). A VLC signal is carried over light having such wavelength characteristics.

The information that is communicated using VLC may include a unique identifier that is broadcast by a light fixture installed in a retail environment. The unique identifier may be received by a suitable sensor (e.g., a digital camera sensor) of a mobile device that includes a suitable digital camera sensor. The mobile device may decode the unique identifier to perform a positioning or orientation operation in the retail environment.

If the identifier that is broadcast by the light fixture remains constant for a sufficient length of time, an unauthorized device may be able to decode the identifier and map the identifier to the light fixture. In such a situation, the unauthorized device may be able to decode the identifiers and map the identifiers to the positions of the light fixtures. Accordingly, a rogue service provider may be able to provide location-based services to unauthorized devices.

Aspects of the disclosure are directed to improving security of information (e.g., identification information) that is transmitted by devices in an environment (e.g., light fixtures installed in a retail environment). According to particular aspects, the security is improved using presently available lighting infrastructure and light fixture drivers. Also according to particular aspects, the security is improved to increase the likelihood that only authorized devices are able to decode and use the identification information.

FIG. 1 illustrates a plan view 100 illustrating an arrangement of devices 104 that are positioned in an environment 102. The devices 104 may be light fixtures. The positions of the light fixtures 104 may be stationary.

At a particular light fixture 104, transmission of information may be controlled by a driver (e.g., ballast). The driver may control a device of the light fixture 104 that emits light suitable for transmitting information using VLC. For example, the light fixture 104 may include a light-emitting diode (LED) that is configured to emit such light. Certain LEDs may emit light to transmit information at a rate of up to 500 Mbits/second.

The environment 102 may be a commercial environment (e.g., a retail environment such as a department store). According to one aspect, the light fixtures 104 are installed at or around the ceiling of the department store.

Each of the light fixtures 104 may transmit information. The information transmitted by a particular light fixture 104 may include a unique identifier (e.g., an identifier that uniquely identifies the light fixture). For example, with reference to FIG. 1, the light fixture 104-1 may transmit a unique identifier that uniquely identifies the light fixture 104-1 from among all of the light fixtures that are positioned in the environment 102 (e.g., light fixtures 104-1, 104-2, 104-3, 104-4, 104-5, 104-6, 104-7, 104-8).

Information transmitted by one or more of the light fixtures 104 may be received by a device 106, which is also located in the environment 102. The device 106 may be a mobile device such as a mobile telephone, a tablet device, a notebook computer, etc. The device 106 may include a photodiode that is configured to receive signals (e.g., VLC signals). For example, the device 106 may include a digital camera sensor that includes one or more photodiodes (e.g., pixels).

The unique identifiers that are transmitted by the light fixtures 104 will now be described in more detail. Each identifier may include a codeword of a particular length. To improve security, the identifier transmitted by a particular light fixture 104 may change over time.

For example, the particular light fixture 104 may be controlled (e.g., by the driver) to transmit a different identifier every time that it detects a trigger (e.g., a reset event). In this regard, the driver may control the light fixture (e.g., light fixture 104-1) to transmit a particular codeword (e.g., $C(i)$) when it detects a corresponding trigger event (e.g., an $i^{th}$ reset event).

The particular codeword may be a result of an algorithm involving sequentially cycling through, a pre-set list of codewords (e.g., a list of N codewords) that are stored in the driver (e.g., in firmware of the driver). Upon detecting a reset event (e.g., an $i^{th}$ reset event), the driver may select the corresponding codeword $C(i)$. The codeword $C(i)$ may not have been selected upon detection of any of the prior (N−1) reset events. Accordingly, the codeword $C(i)$ is selected no more than once every N reset events.

For purposes of illustration, the output of the above algorithm will be described with reference to entries of a matrix.

Figure 2:
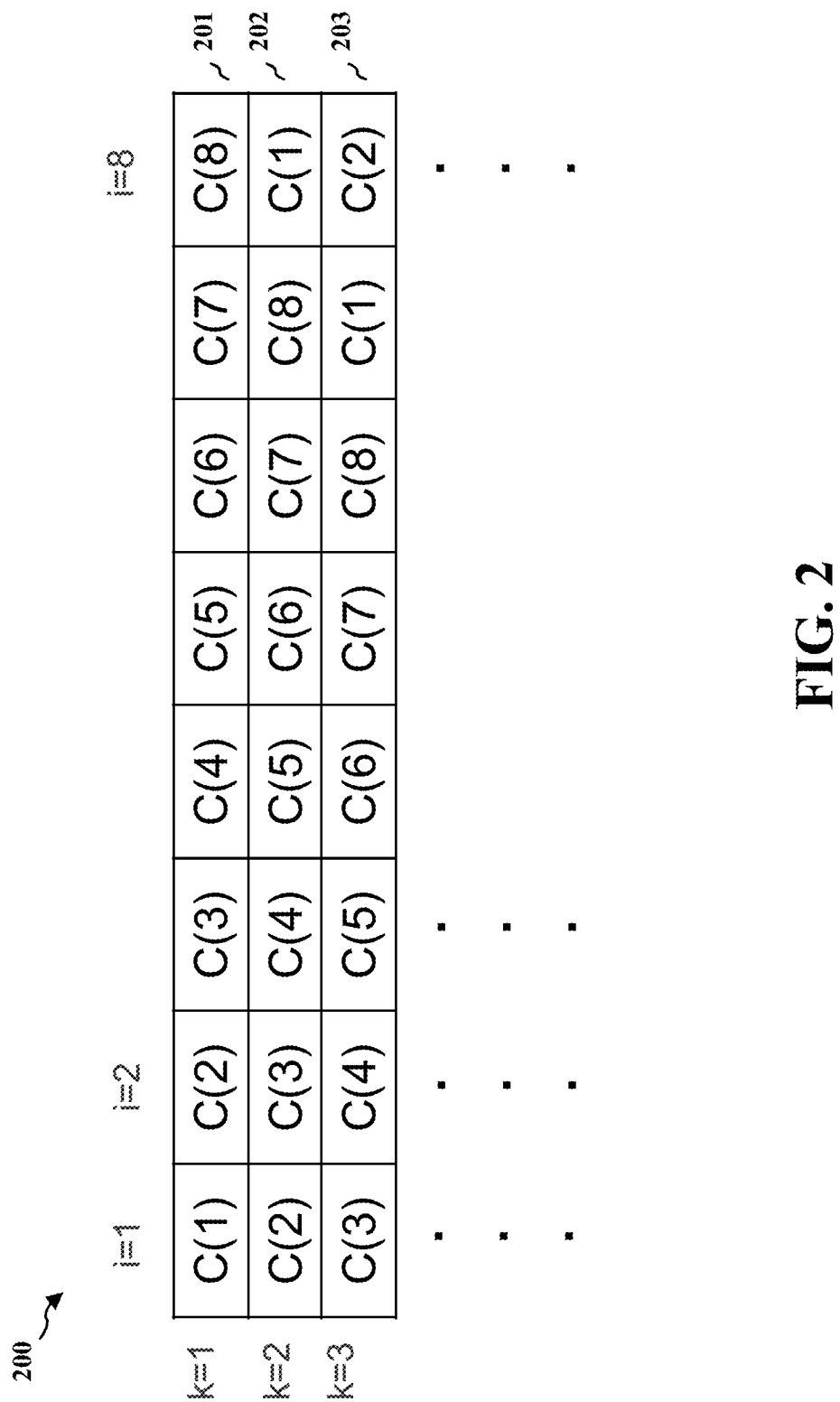
FIG. 2 illustrates entries in a portion of a matrix.

FIG. 2 illustrates entries in a portion of a matrix 200. The matrix 200 includes rows 201, 202 and 203. The rows 201, 202, 203 may contain the codewords that are stored at respective light fixtures. For example, with reference back to FIG. 1, the rows 201, 202, 203 may list the codewords that are stored at light fixtures 104-1, 104-2, 104-3, respectively.

The columns of the matrix 200 may contain the codewords that are transmitted by the light fixtures 104 at different times. For example, the leftmost column of the matrix 200 (labeled "i=1") may list the codewords that are transmitted by the light fixtures 104 after the light fixtures detect a $1^{st}$ reset event. Similarly, the second leftmost column of the matrix (labeled "i=2") may list the codewords that are transmitted by the light fixtures 104 after the light fixtures detect a $2^{nd}$ reset event. Similarly, the rightmost column of the matrix (labeled "i=8") lists the codewords that are transmitted by the light fixtures 104 after the light fixtures detect an $8^{th}$ reset event.

The row 201 may contain the codewords that are stored at light fixture 104-1. Accordingly, the light fixture 104-1 transmits the codewords C(1), C(2), C(3), C(4), C(5), C(6), C(7) and C(8) after it detects the $1^{st}$ reset event, the $2^{nd}$ reset event, the $3^{rd}$ reset event, the $4^{th}$ reset event, the $5^{th}$ reset event, the $6^{th}$ reset event, the $7^{th}$ reset event and the $8^{th}$ reset event, respectively.

The row 202 may contain the codewords that are stored at light fixture 104-2. Accordingly, the light fixture 104-2 transmits the codewords C(2), C(3), C(4), C(5), C(6), C(7), C(8) and C(1) after it detects the $1^{st}$ reset event, the $2^{nd}$ reset event, the $3^{rd}$ reset event, the $4^{th}$ reset event, the $5^{th}$ reset event, the $6^{th}$ reset event, the $7^{th}$ reset event and the $8^{th}$ reset event, respectively.

The row 203 may contain the codewords that are stored at light fixture 104-3. Accordingly, the light fixture 104-3 transmits the codewords C(3), C(4), C(5), C(6), C(7), C(8), C(1) and C(2) after the light fixture detects the $1^{st}$ reset event, the $2^{nd}$ reset event, the $3^{rd}$ reset event, the $4^{th}$ reset event, the $5^{th}$ reset event, the $6^{th}$ reset event, the $7^{th}$ reset event and the $8^{th}$ reset event, respectively.

According to the algorithm described with reference to the matrix 200, no two light fixtures transmit the same codeword during a particular time. For example, during the time between the $1^{st}$ reset event and the $2^{nd}$ reset event, the codeword C(1) is transmitted by the light fixture 104-1 and not by any other of the light fixtures 104 (e.g., light fixtures 104-2, 104-3, 104-4, 104-5, 104-6, 104-7, 104-8 of FIG. 1). Similarly, during the time between the same two reset events, the codeword C(2) is transmitted by the light fixture 104-2 and not by any other of the light fixtures 104 (e.g., light fixtures 104-1, 104-3, 104-4, 104-5, 104-6, 104-7, 104-8 of FIG. 1).

The algorithm described with reference to FIG. 2 may be expressed mathematically as follows. If K denotes the number of light fixtures 104 and if N denotes the number of codewords in the codebook (such that N≥K), then the $k^{th}$ light fixture chooses the codeword C((i+k−1) mod N) after the light fixture detects the $i^{th}$ reset event, for i={1, 2, . . . , N} and k={1, 2, . . . , K}).

A potential issue regarding the algorithm of FIG. 2 is that it may be possible to predict the codeword that is transmitted by a particular fixture at a particular time, by observing the codeword that is transmitted by another fixture at an earlier time. For example, it may be possible to predict the codeword that will be transmitted by the $(k−1)^{th}$ fixture after the $i^{th}$ reset event, by observing the codeword that is transmitted by the $k^{th}$ fixture after the $(i−1)^{th}$ reset event. For example, with reference to FIG. 2, it may be possible to predict that the codeword C(8) will be transmitted by the $1^{st}$ fixture (e.g., fixture 104-1 of FIG. 1) after the $8^{th}$ reset event, by observing that the same codeword C(8) was transmitted by the $2^{nd}$ fixture (e.g., fixture 104-2 of FIG. 1) after the $7^{th}$ reset event.

Aspects of the disclosure are directed to reducing the likelihood that the codeword that will be transmitted by one light fixture can be predicted based an observed codeword that is transmitted by another light fixture.

According to one aspect, the likelihood is reduced by permuting the matrix that corresponds to a particular algorithm. An example of a permutation will be described with reference to FIGS. 3A and 3B.

FIG. 3A illustrates codewords of a matrix 300. Similar to the matrix 200 of FIG. 2, the rows of the matrix 300 may list the codewords that are stored at respective light fixtures. Also similar to the matrix 200 of FIG. 2, the columns of the matrix 300 may list the codewords that are transmitted by the light fixtures at respective times.

A permutation may be performed on the matrix 300, for example, by swapping the entries of the second leftmost column 302 with the entries of the second rightmost column 304. This permutation produces the matrix 310 that is illustrated in FIG. 3B.

The matrix 310 of FIG. 3B includes columns 312 and 314. The entries of column 312 of matrix 310 are equal to the entries of the second rightmost column 304 of matrix 300 (see FIG. 3A). Similarly, the entries of column 314 of matrix 310 are equal to the entries of the second leftmost column 302 of matrix 300 (see FIG. 3A).

Selecting codewords using the algorithm corresponding to the matrix 310 may reduce the likelihood that the codeword that will be transmitted by one light fixture can be predicted based an observed codeword that is transmitted by another light fixture. For example, due to the permutation described with reference to FIGS. 3A and 3B, it may be more difficult to predict the codeword that will be transmitted by the $(k−1)^{th}$ fixture after the $i^{th}$ reset event, based merely on observing the codeword that is transmitted by the $k^{th}$ fixture after the $(i−1)^{th}$ reset event.

An example of a permutation operation has been described with reference to the 3-by-3 matrices of FIGS. 3A and 3B. It is understood that a similar operation may be performed on matrices of different sizes to obtain similar results.

For example, aspects of this disclosure are directed to information communicated by light fixtures that are located in a retail environment. In such an environment, around 1200 light fixtures (e.g., the light fixtures 104 of FIG. 1) may be installed. Also, the 1200 light fixtures may be controlled at each of 1200 reset events. Accordingly, the codewords that are transmitted by the light fixtures in response to detecting the different reset events may be arranged in a 1200-by-1200 matrix.

Similar to the matrix 310 of FIG. 3B, the rows of the 1200-by-1200 matrix may contain the codewords that are stored at respective light fixtures. For example, a particular row of the 1200-by-1200 matrix contains the codeword sequence that is stored at the respective light fixture.

Also similar to the matrix 310 of FIG. 3B, the columns of the 1200-by-1200 may contain the codewords that are transmitted by the light fixtures at respective times. For example, after detecting the $i^{th}$ reset event, the $k^{th}$ light fixture transmits the codeword that corresponds to the $i^{th}$ element of the codeword sequence that is stored at the light fixture (e.g., the entry at the $i^{th}$ element of the $k^{th}$ row of the 1200-by-1200 matrix).

Matrices that have been described with reference to various aspects illustrate examples of codeword assignments. It is understood that other types of matrices may be employed. According to particular aspects, codeword sequences are drawn from a matrix in which a given entry (e.g., a given codeword) appears exactly once in any given row and exactly once in any given column. Such a matrix is known as a Latin square.

Figure 4:
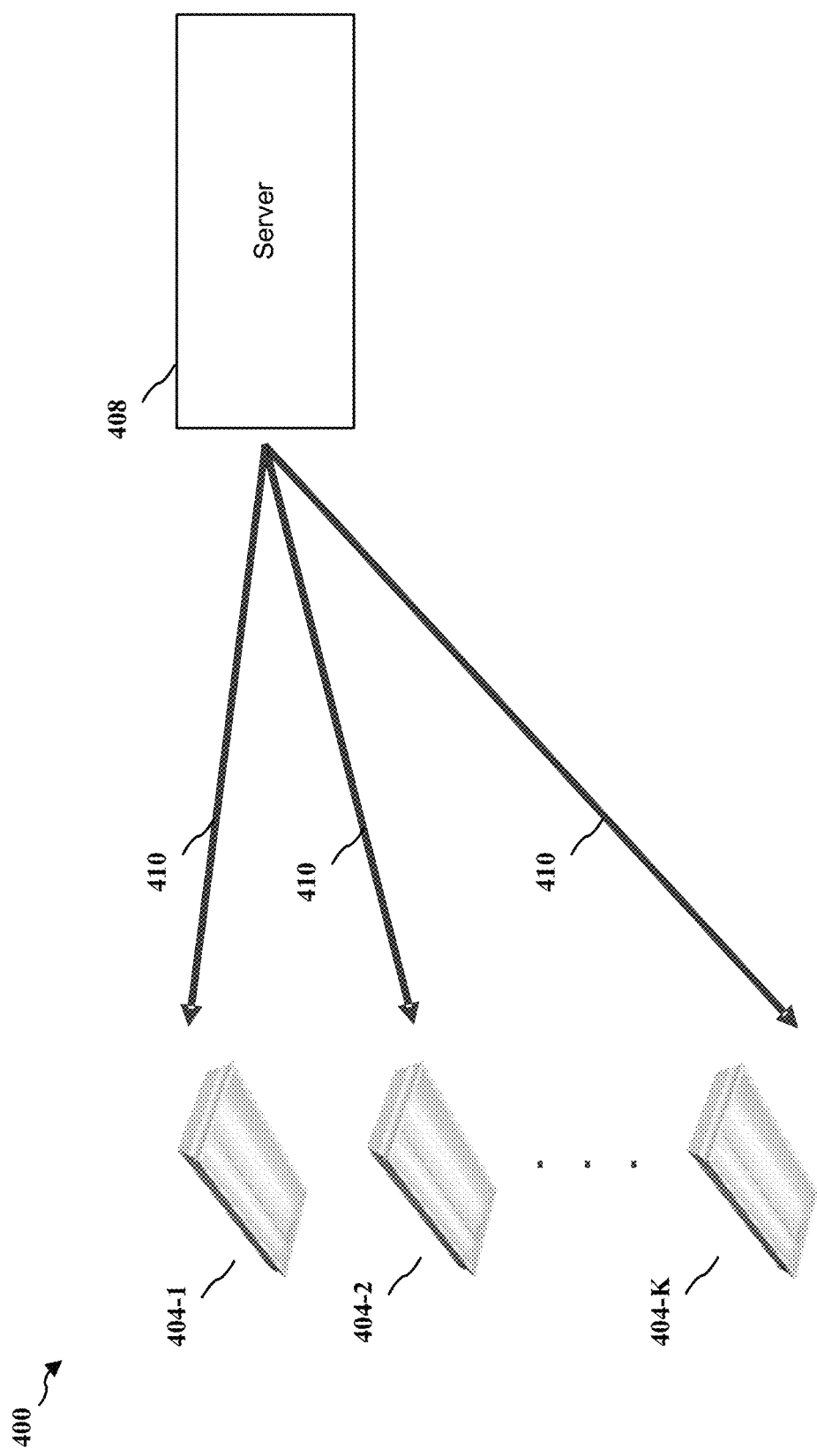
FIG. 4 is a diagram that illustrates control of light fixtures by a server.

FIG. 4 is a diagram that illustrates control of light fixtures by a server. Light fixtures 404-1, 404-2, . . . , 404-K may be similar to light fixtures described earlier with reference to FIG. 1 (e.g., light fixtures 104). Each of the light fixtures 404 may store a respective codeword sequence. For example, each light fixture 404 may store entries of a corresponding row of a Latin square.

Similar to aspects described earlier, each of the light fixtures 404 transmits a different codeword of its codeword sequence upon detecting a reset event. Also similar to aspects described earlier, the different codeword may be the next adjacent codeword in the codeword sequence. Accordingly, a particular light fixture 404 may transmit a particular codeword before it detects a particular reset event, and may transmit a next adjacent codeword in its codeword sequence after it detects the particular reset event.

With reference to FIG. 4, the reset event may be a reset event signal 410 that is signaled by a server 408 to all of the light fixtures 404. According to one aspect, the server is a server that is operated by a retailer (e.g., a Building Management System (BMS) server). By sending the reset event signal 410, the server 408 effectively instructs each light fixture to begin transmitting a different codeword (e.g., the next codeword in its codeword sequence).

According to one aspect, the reset event is signaled by powering the light fixtures OFF and ON according to a particular pattern. For example, the server 408 may signal a reset event to the light fixtures 404 by supplying and withholding power to and from all of the light fixtures according to a particular pattern. The supplying of power according to the particular pattern is interpreted by the light fixtures 404 (e.g., the drivers of the light fixtures) as a reset event. According to various aspects, the pattern may be defined according to a particular number of ON-to-OFF transitions and/or a particular sequence of durations of time during which the light fixtures 404 are powered ON.

Figure 5:
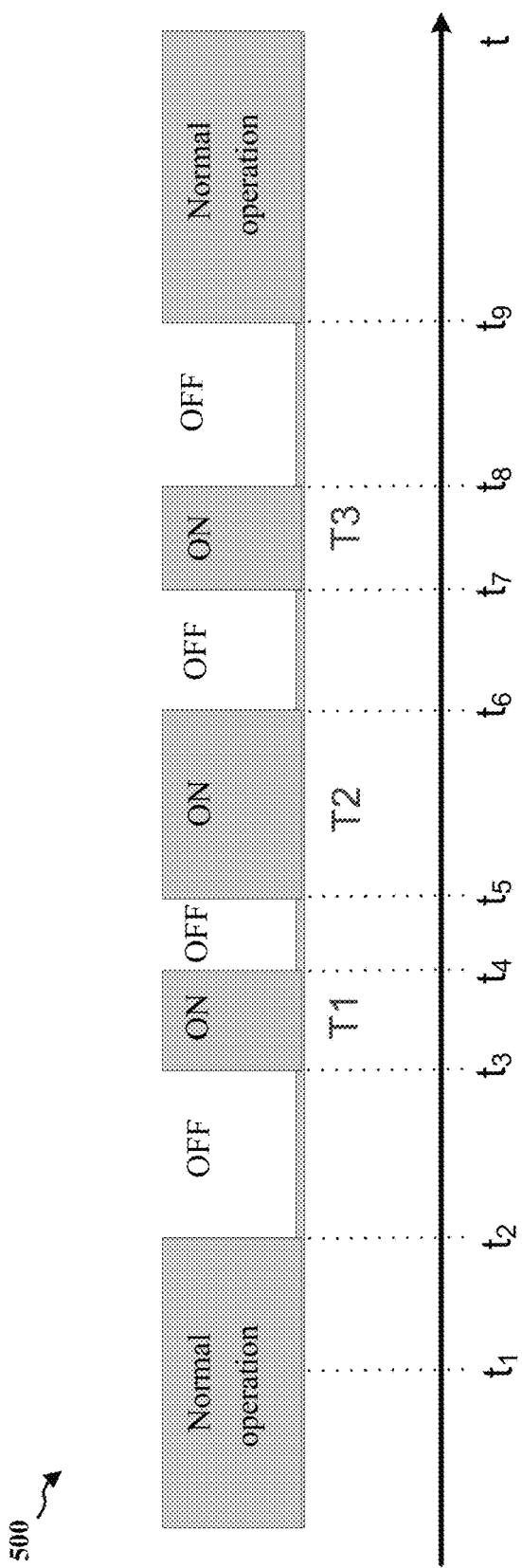
FIG. 5 illustrates an example of a power cycling pattern

FIG. 5 illustrates an example of a power cycling pattern 500. At time $t_1$, power is supplied to all of the light fixtures (e.g., light fixtures 404 of FIG. 4). The pattern 500 begins at time $t_2$, when the light fixtures are powered OFF by the server (e.g., server 408 of FIG. 4). Further according to the pattern 500, the light fixtures are powered back ON at time $t_3$ and remain on for a duration of T1. Further according to the pattern 500: at time $t_4$, the light fixtures are powered OFF by the server; the light fixtures are powered back ON at time $t_5$ and remain on for a duration of T2; at time $t_6$, the light fixtures are powered OFF by the server; the light fixtures are powered back ON at time $t_7$ and remain on for a duration of T3. The pattern 500 ends at time $t_8$, when the light fixtures are powered OFF by the server. At time $t_9$, the light fixtures are powered back ON. When the light fixtures are powered back ON, the light fixtures determine that a complete pattern 500 has taken place. Accordingly, the light fixtures interpret the occurrence of the pattern 500 as a reset event.

According to particular aspects, the durations of T1, T2 and T3 may be in units of seconds or fractions of seconds (e.g., milliseconds). Reducing the lengths of these time durations reduces the likelihood that power outage events may interfere with transmission/detection of the pattern 500. Also, it is understood that the number of durations of times during which the light fixtures are powered ON may be greater or fewer than 3.

As noted earlier, the supplying of power according to the particular pattern may be interpreted by the light fixtures (e.g., the drivers of the light fixtures) as a reset event. For example, with reference to the pattern 500 of FIG. 5, the driver has knowledge of a particular sequence of durations (e.g., T1, T2, T3). In order to determine whether a particular pattern has taken place, the driver may implement the following algorithm.

The algorithm uses a dedicated counter A, where the count of the counter A is denoted by X. An index i having an initial value of 1 is used to count the number of reset events.

When the power is turned ON, the driver checks if X has reached Ti. If X has reached Ti, then the index i is incremented by 1. In either case, the counter is reset to zero to start counting anew.

If the index i reaches 3, the driver determines that the reset event has been detected. Otherwise, the driver repeats the steps described in the paragraph above.

As described with reference to FIG. 5, a reset event may be signaled using a particular power cycling pattern. According to an aspect, the reset event is detected if the power ON intervals exactly match the durations defined by the power cycling pattern. For example, if a length of the first detected power ON interval is equal to T1 but a length of the next detected power ON interval is not equal to T2, then a reset event is not detected. In this situation, the driver restarts the algorithm and, accordingly, checks for a power ON interval of length T1.

The signaling of the particular power cycling pattern may be useful when the light fixtures (e.g., light fixtures 404) are not capable of receiving/interpreting other types of control signals (e.g., Digital Addressable Lighting Interface (DALI) signals, Digital Multiplex (DMX) protocol signals, wireless radio frequency (RF) signals). Further, such a signaling may also be useful when the light fixtures are not capable of receiving/interpreting voltage dimming signals.

If the light fixtures are capable of receiving/interpreting any of the above signal types, then the corresponding signal(s) may be used to communicate a reset event. For example, if suitable, the server 408 may signal a reset event to the light fixtures 404 by sending a signal (e.g., DALI signal or a DMX signal) either over a wired interface or a wireless interface (e.g., a RF interface). As another example, the server 408 may signal a reset event to the light fixtures by applying a specific pattern of voltage amplitudes to a dimming signal input (e.g., a "0-10V" dimming signal input) of the light fixtures.

Figure 6:
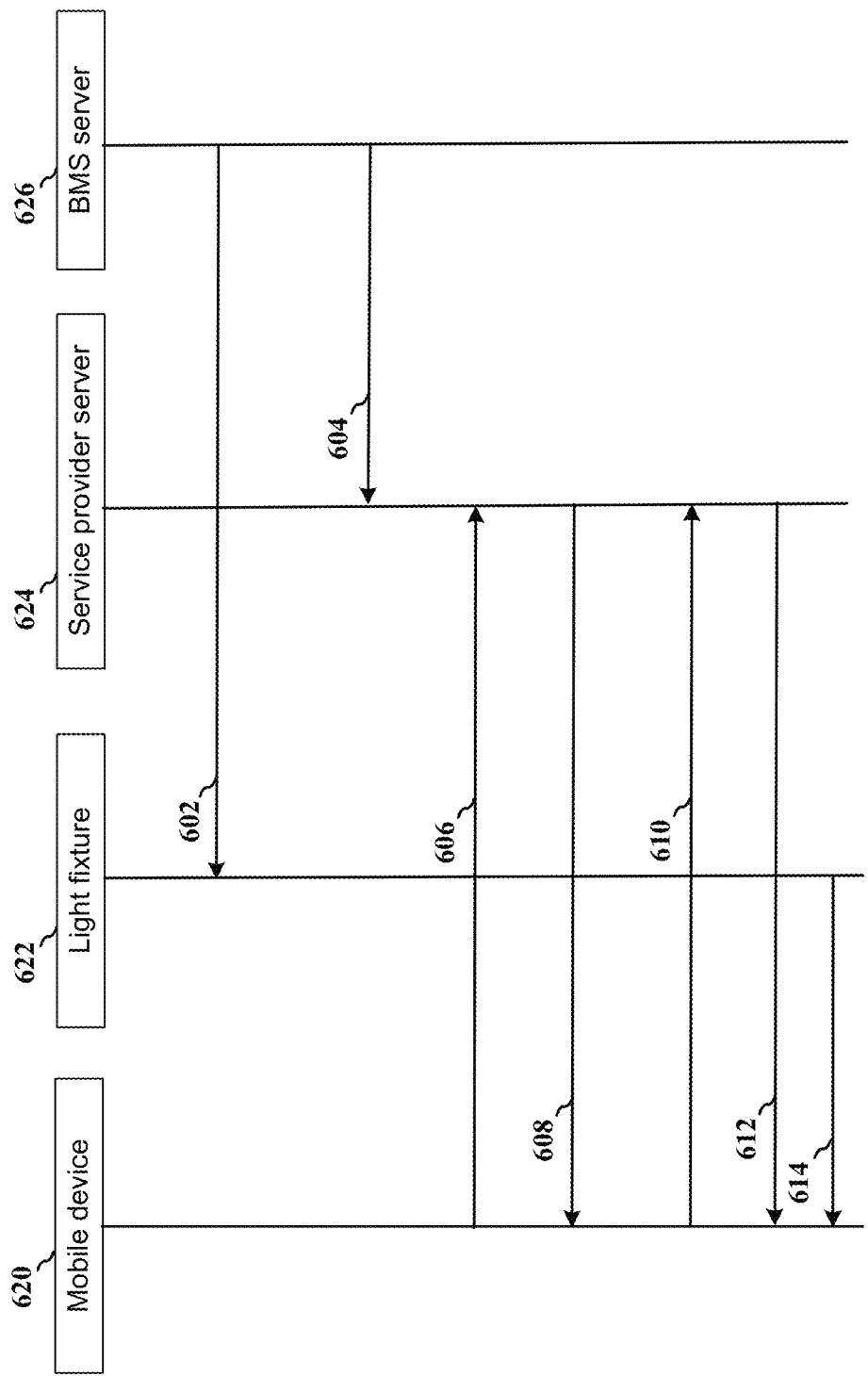
FIG. 6 is a signal diagram illustrating data that is communicated between multiple entities.

FIG. 6 is a signal diagram illustrating data that is communicated between multiple entities.

At 602, the BMS server 626 (e.g., server 408) sends a reset event signal to the light fixture 622 (e.g., one of light fixtures 404). In conjunction with 602, at 604, the BMS server 626 communicates the reset event to a service provider server 624. For example, the BMS server 626 may send identification of the particular reset event epoch (e.g., $1^{st}$ reset event, $2^{nd}$ reset event, $3^{rd}$ reset event, etc.) to the service provider server 624. As will be described in more detail later, the service provider server 624 services an application (e.g., a location-based service, a positioning service) that is launched by the mobile device 620.

At 602, the light fixture 622 interprets that a reset event has occurred. Accordingly, at 614, the light fixture 622 transmits the corresponding identifier (e.g., codeword).

At 606, the mobile device 620 requests a download of the application. At 608, the service provider server 624 facilitates the download of the application to the mobile device 620. In addition, the service provider server 624 may provide the mobile device 620 with map information regarding locations of light fixtures (e.g., location of light fixtures 104 in environment 102). The map information may indicate the locations (e.g., (x, y) coordinates) of the light fixtures installed in the environment (see, e.g., the arrangement of light fixtures 104 illustrated in FIG. 1).

So long as these locations remain generally constant, it may not be necessary to provide the map information to the mobile device 620 more than once. As described above, the mobile device 620 may receive the map information concurrent with the download of the application. Alternatively, the mobile device 620 may receive the map information the first time it enters the environment (e.g., environment 102).

Concurrent with the download of the application, the service provider server 624 may also provide identifiers to the mobile device 620. The identifiers are used by the light fixture 622 and all other light fixtures during each of the reset epochs. This information may be in the form of a matrix (e.g., a form similar to the matrix 310 of FIG. 3B). Alternatively, the identifiers used by the light fixtures may be provided at a later time.

At 610, the mobile device 620 launches (e.g., starts) the application. A location service request is sent to the service provider server 624.

The location service request is serviced by the service provider server 624. At 612—the service provider server 624 sends information to the mobile device 620 to enable the mobile device to perform positioning operations. As described earlier, the mobile device 620 may have previously received all of the identifiers used by the light fixtures at each of the reset epochs (e.g., a matrix that was received during download of the application). In this situation, at 612, the service provider server 624 sends the current reset epoch (e.g., identification of the relevant column of the matrix of the identifiers) to the mobile device 620. Accordingly, the mobile device 620 is able to identify the particular identifiers that are used by the light fixtures at the current epoch.

Alternatively—if the mobile device 620 did not previously receive the above identifier information, at 612, the service provider server 624 may send the identifiers contained in the relevant column of the matrix to the mobile device 620. Accordingly, the mobile device 620 is informed of the particular identifiers that are used by the light fixtures at the current epoch.

Once the mobile device 620 has launched the application, the information that has been described with reference to 612 may be provided at times other than the launching of the application. For example, the information of 612 may be provided to the mobile device 620 during the occurrence of each reset event. Further, the information of 612 may be provided to the mobile device 620 whenever it reenters the environment (e.g., environment 102).

With reference to 614, the mobile device 620 receives the identifier(s) transmitted by the corresponding light fixture(s) (e.g., light fixture 622). Based on information that the mobile device received earlier (e.g., at 608 and 612), the mobile device 620 is able to determine the locations of light fixtures transmitting particular identifiers. Accordingly, the mobile device is able to position (e.g., orient) itself in the environment (e.g., environment 102) with respect to the locations of the various light fixtures.

Figure 7:
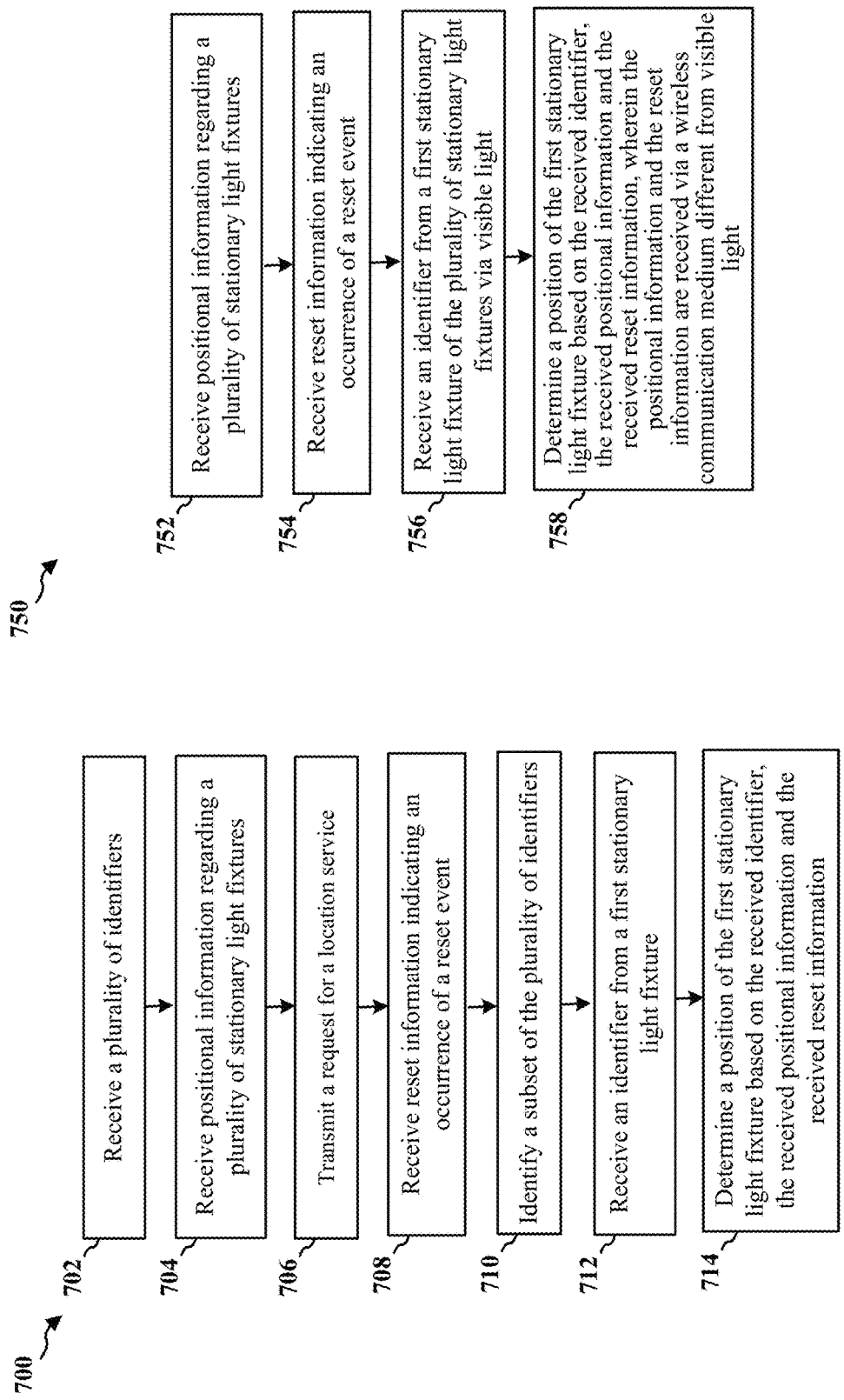
FIG. 7A is a flow chart of a method of operating a device.
FIG. 7B is a flow chart of a method of operating a device.

FIG. 7A is a flow chart 700 of a method of operating a device. At 702, a device (e.g., mobile device 106 of FIG. 1) receives a plurality of identifiers. For example, with reference back to FIG. 3B, the device receives codewords that are arranged in a matrix similar to the matrix 310. In one configuration, the device may use the transceiver 1010 or the reception component 904 to receive the plurality of identifiers. At 704, the device receives (e.g., through transceiver 1010 or reception component 904) positional information regarding a plurality of stationary light fixtures. For example, with reference back to FIG. 1, the device receives positional information that corresponds to (x, y) coordinate information that is captured by the plan view 100 of FIG. 1. Such information may be received at 608 of FIG. 6.

At 706, the device transmits (e.g., through transceiver 1010 or transmission component 910) a request for a location service. The location service may be an application (e.g., a location-based service, a positioning service) that is served by a service provider server (e.g., server 624 of FIG. 6). The request may be transmitted at 610 of FIG. 6.

At 708, the device receives (e.g., through transceiver 1010 or reception component 904) reset information indicating or corresponding to an occurrence of a reset event. The reset information may be received in response to the transmission of the request for a location service. The reset information may include either a subset of a plurality of identifiers (e.g., a column of a matrix similar to the matrix 310) or an index that is for identifying the subset of the plurality of identifiers. An example of an index may be an index that indicates a current reset epoch (see, e.g., 612 of FIG. 6).

At 710, the device identifies (e.g., using processor 1004 or identification component 906) a subset of the plurality of identifiers. For example, the subset may be identified if the reset information includes the index. As described earlier with reference to 608, 612 of FIG. 6, the device may use the index to determine the identifiers that are used by the light fixtures at the current reset epoch. The identifiers may be determined based on a received matrix and received information indicating a particular column of the matrix. As another example, the subset may be determined based on a column of the matrix that is included in the reset information.

At 712, the device receives (e.g., using camera or light sensor 1012 or reception component 904) an identifier from a stationary light fixture. For example, as described with reference to 614 of FIG. 6, the device receives the identifier transmitted by a stationary light fixture. The identifier may be received from the stationary light fixture via visible light.

At 714, the device determines (e.g., using processor 1004 or determination component 908) a position of the first stationary light fixture based on the received identifier, the received positional information and the received reset information. For example, the received identifier may be a codeword, and the device may match the received codeword against the codewords of the corresponding column of a matrix (which may be included in the reset information, or which may be identified using an index that is included in the reset information). For example, with reference to FIG. 3B, if the $2^{nd}$ reset event has occurred and the mobile device has received the codeword C(4), the mobile device may match the codeword C(4) against the codewords of column 312 of matrix 310. Because C(4) matches the $2^{nd}$ topmost entry of the column, the mobile device may determine light fixture #2 as the source of the received identifier.

Further, the device determines a position of the first stationary light fixture based on the received positional information. Further regarding the example described in the above paragraph, the device determines a position of the light fixture #2 based on positional information of the light fixtures (e.g., positional information corresponding to (x, y) coordinate information that is captured by the plan view 100 of FIG. 1).

By using the determined position of one or more light fixtures in an environment (e.g., environment 102) (e.g., by using the determined position(s) as reference position(s)), the device may be better able to position or orient itself within the environment.

As disclosed earlier with reference to 712, the device may receive the identifier via visible light. The positional information and the reset information (see, e.g., 704 and 708) may be received via a wireless communication medium that is different from visible light. For example, the positional information and the reset information may be received via a wireless communication medium that more readily supports a bit rate that is higher than that which is typically supported by VLC.

FIG. 7B is a flow chart 750 of a method of operating a device. At 752, a device (e.g., mobile device 106 of FIG. 1) receives positional information regarding a plurality of stationary light fixtures. For example, with reference back to FIG. 1, the device receives positional information that corresponds to (x, y) coordinate information that is captured by the plan view 100 of FIG. 1. Such information may be received at 608 of FIG. 6. In one configuration, the device may use the transceiver 1010 or the reception component 904 to receive the positional information.

At 754, the device receives (e.g., through transceiver 1010 or reception component 904) reset information indicating or corresponding to an occurrence of a reset event. The reset information may be received in response to the transmission of the request for a location service. The reset information may include either a subset of a plurality of identifiers (e.g., a column of a matrix similar to the matrix 310) or an index that is for identifying the subset of the plurality of identifiers. An example of an index may be an index that indicates a current reset epoch (see, e.g., 612 of FIG. 6).

At 756, the device receives (e.g., using camera or light sensor 1012 or reception component 904) an identifier from a stationary light fixture. For example, as described with reference to 614 of FIG. 6, the device receives the identifier transmitted by a stationary light fixture. The identifier may be received from the stationary light fixture via visible light.

At 758, the device determines (e.g., using processor 1004 or determination component 908) a position of the first stationary light fixture based on the received identifier, the received positional information and the received reset information. The positional information and the reset information are received via a wireless communication medium different from visible light. For example, the received identifier may be a codeword, and the device may match the received codeword against the codewords of the corresponding column of a matrix (which may be included in the reset information, or which may be identified using an index that is included in the reset information). For example, with reference to FIG. 3B, if the $2^{nd}$ reset event has occurred and the mobile device has received the codeword C(4), the mobile device may match the codeword C(4) against the codewords of column 312 of matrix 310. Because C(4) matches the $2^{nd}$ topmost entry of the column, the mobile device may determine light fixture #2 as the source of the received identifier.

Further, the device determines a position of the first stationary light fixture based on the received positional information. Further regarding the example described in the above paragraph, the device determines a position of the light fixture #2 based on positional information of the light fixtures (e.g., positional information corresponding to (x, y) coordinate information that is captured by the plan view 100 of FIG. 1).

By using the determined position of one or more light fixtures in an environment (e.g., environment 102) (e.g., by using the determined position(s) as reference position(s)), the device may be better able to position or orient itself within the environment.

As disclosed earlier with reference to 756, the device may receive the identifier via visible light. The positional information and the reset information (see, e.g., 704 and 708) may be received via a wireless communication medium that is different from visible light. For example, the positional information and the reset information may be received via a wireless communication medium that more readily supports a bit rate that is higher than that which is typically supported by VLC.

Figure 8:
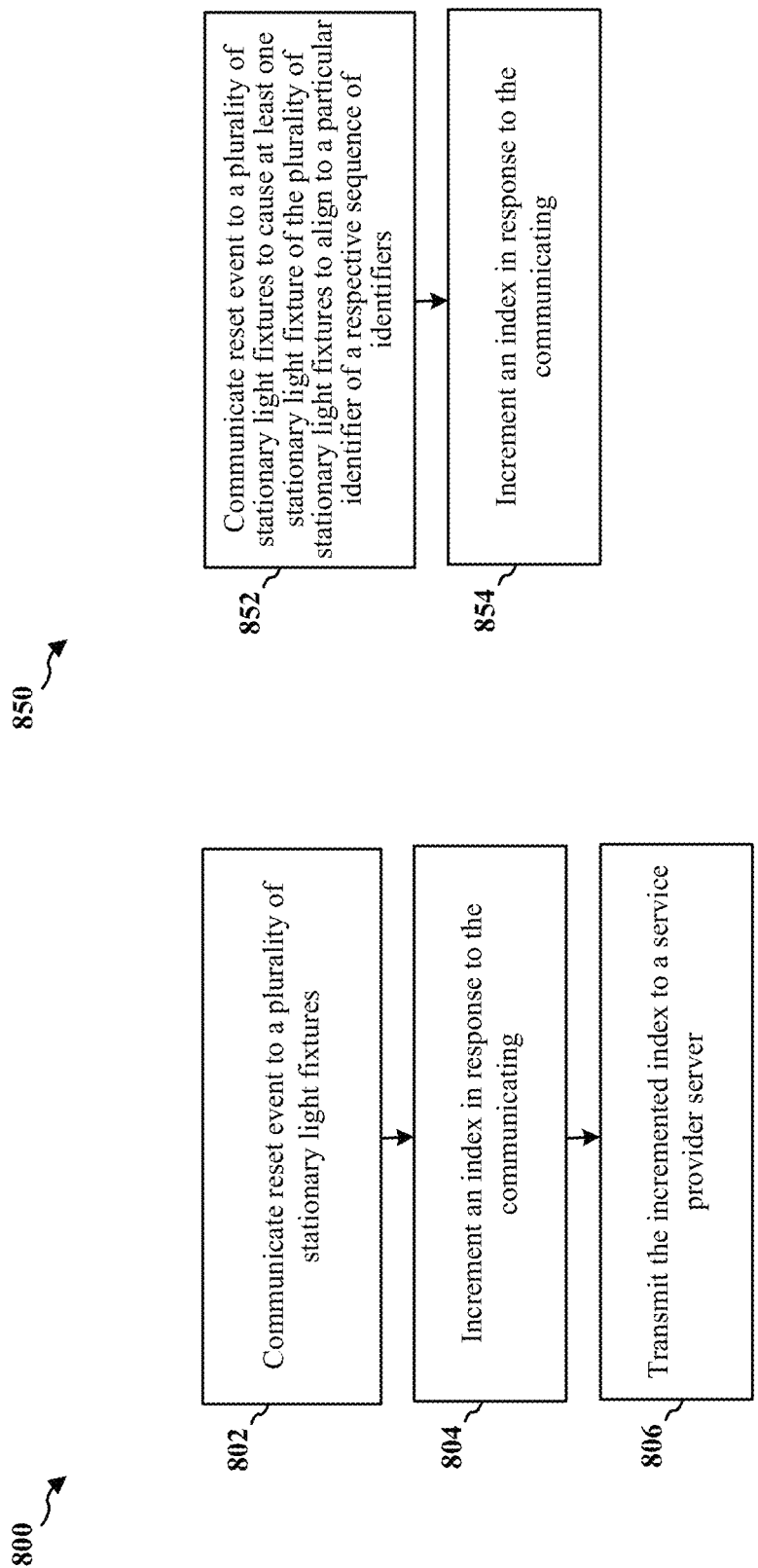
FIG. 8A is a flow chart of a method of operating a device.
FIG. 8B is a flow chart of a method of operating a device.

FIG. 8A is a flow chart 800 of a method of operating a device. The device may be a BMS server. At 802, the device communicates (e.g., using power supply controller 1212 or communication component 1104) a reset event to a plurality of stationary light fixtures. For example, with reference to FIG. 4, the server 408 communicates a reset event signal 410 to light fixtures 404. The communication causes at least one of the light fixtures to align to a particular identifier of a respective sequence of identifiers. For example, the light fixture may align a pointer to an identifier in an adjacent entry in a row of matrix 310 that corresponds to the light fixture. The communication may further cause the light fixture to transmit the identifier via visible light.

The reset event may be communicated by powering off and on each of the plurality of stationary devices concurrently according to a particular pattern (e.g., see pattern 500 of FIG. 5). Alternatively, the reset event may be communicated by powering each of the plurality of stationary devices concurrently according to a particular pattern of voltage amplitudes. Alternatively, the reset event may be communicated by transmitting a signal indicating the occurrence of the reset event. The signal may be transmitted over a wired connection (e.g., using a DALI or a DMX protocol) or over a wireless RF interface.

At 804, the device may increment (e.g., using processor 1204 or incrementing component 1106) an index in response to the communicating. For example, the index may indicate the current reset epoch, as described earlier with reference to 612 of FIG. 6.

At 806, the device may transmit (e.g., using network interface controller 1210 or transmission component 1108) the index to a service provider server (e.g., service provider server 624). Accordingly, the device communicates the reset event to the service provider server 624 (see, e.g., 604 of FIG. 6). In this regard, the device may send identification of the particular reset event epoch (e.g., $1^{st}$ reset event, $2^{nd}$ reset event, $3^{rd}$ reset event, etc.) to the service provider server 624.

FIG. 8B is a flow chart 850 of a method of operating a device. The device may be a BMS server. At 852, the device communicates (e.g., using power supply controller 1212 or communication component 1104) a reset event to a plurality of stationary light fixtures. For example, with reference to FIG. 4, the server 408 communicates a reset event signal 410 to light fixtures 404. The communication causes at least one of the light fixtures to align to a particular identifier of a respective sequence of identifiers. For example, the light fixture may align a pointer to an identifier in an adjacent entry in a row of matrix 310 that corresponds to the light fixture. The communication may further cause the light fixture to transmit the identifier via visible light.

The reset event may be communicated by powering off and on each of the plurality of stationary devices concurrently according to a particular pattern (e.g., see pattern 500 of FIG. 5). Alternatively, the reset event may be communicated by powering each of the plurality of stationary devices concurrently according to a particular pattern of voltage amplitudes. Alternatively, the reset event may be communicated by transmitting a signal indicating the occurrence of the reset event. The signal may be transmitted over a wired connection (e.g., using a DALI or a DMX protocol) or over a wireless RF interface.

At 854, the device may increment (e.g., using processor 1204 or incrementing component 1106) an index in response to the communicating. For example, the index may indicate the current reset epoch, as described earlier with reference to 612 of FIG. 6.

Figure 9:
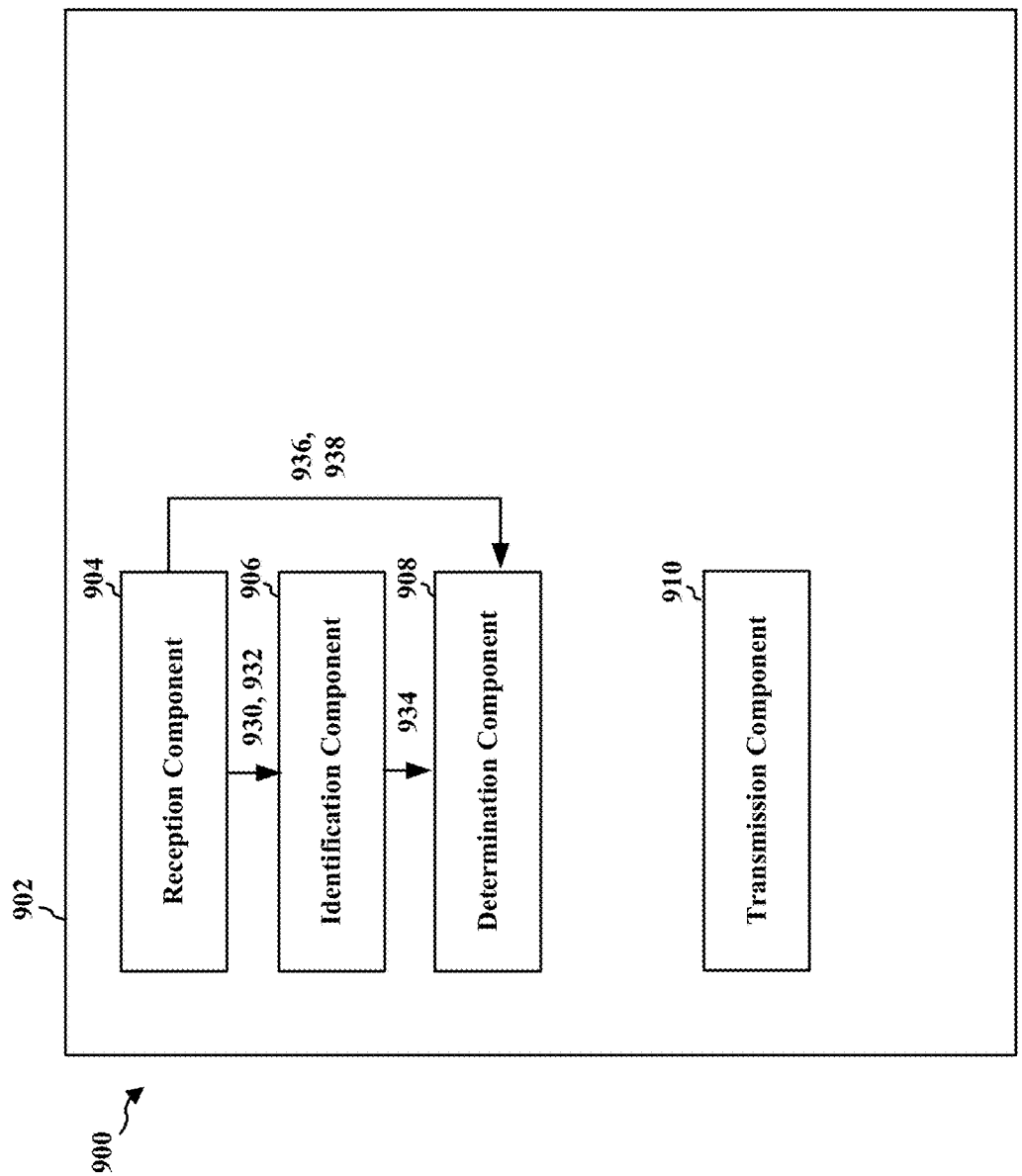
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a mobile terminal. The apparatus 902 may include a reception component 904, an identification component 906, a determination component 908 and a transmission component 910.

The reception component 904 receives a plurality of identifiers (e.g., a matrix or a particular column of the matrix). The received identifiers are output to the identification component 906 as output 930. The reception component 904 also receives positional information regarding a plurality of stationary light fixtures. The received positional information is output to the determination component 908 as output 936.

The transmission component 910 transmits a request for a location service.

The reception component 904 also receives reset information indicating or corresponding to an occurrence of a reset event. The reset information may be received in response to the transmission of the request. The reset information is output to the identification component 906 as output 932.

The identification component 906 identifies a subset of the plurality of identifiers in response to receiving the reset information if the reset information includes an index. For example, similar to the manner described with reference to 608, 612 of FIG. 6, the identification component 906 may determine the identifiers that are used by the light fixtures at the current reset epoch. The identified subset is output to the determination component 908 as output 934.

The reception component 904 receives an identifier (e.g., an identifier transmitted by a light fixture). The received identifier is output to the determination component 908 as output 938.

The determination component 908 determines a position of the light fixture (that had transmitted the received identifier) based on the received identifier, the received positional information and the received reset information.

The apparatus may include additional components that perform each of the steps of the algorithm in the aforementioned flow charts of FIGS. 7A and 7B. As such, each step in the aforementioned flow charts of FIGS. 7A and 7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
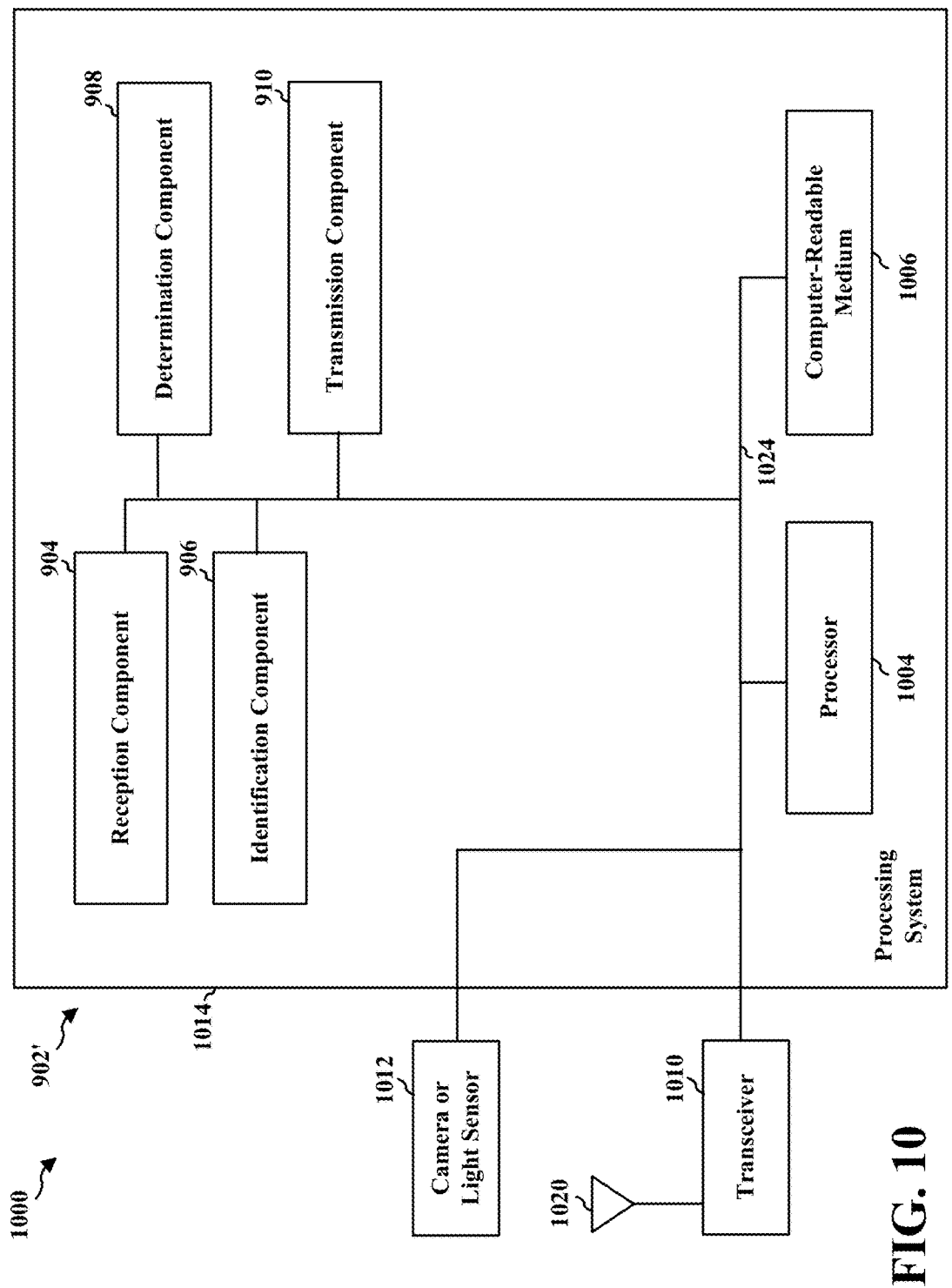
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020.

The processing system 1014 may be coupled to a camera or light sensor 1012. The camera or light sensor 1012 provides a means for receiving information via visible light from other light emitting apparatus. The camera or light sensor 1012 receives a VLC signal from other light emitting apparatus, extracts information from the received VLC signal, and provides the extracted information to the processing system 1014, specifically the reception component 904.

The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the components 904, 906, 908, or 910. The components may be software components running in the processor 1004, resident/stored in the computer readable medium/memory 1006, one or more hardware components coupled to the processor 1004, or some combination thereof.

In one configuration, the apparatus 902/902' includes means for receiving (e.g., 904, 1010) positional information regarding a plurality of stationary light fixtures. In one configuration, the means for receiving position information performs the operations described above with regard to 704 of FIG. 7A or 752 of FIG. 7B. The apparatus further includes means for receiving (e.g., 904, 1010) reset information indicating an occurrence of a reset event. In one configuration, the means for receiving reset information performs the operations described above with regard to 708 of FIG. 7A or 754 of FIG. 7B. The apparatus further includes means for receiving (e.g., 904, 1012) an identifier from a first stationary light fixture of the plurality of stationary light fixtures via visible light. In one configuration, the means for receiving an identifier performs the operations described above with regard to 712 of FIG. 7A or 756 of FIG. 7B. The apparatus further includes means for determining (e.g., 908, 1004) a position of the first stationary light fixture based on the received identifier, the received positional information and the received reset information. The positional information and the reset information are received via a wireless communication medium different from visible light. In one configuration, the means for determining a position of the first stationary light fixture performs the operations described above with regard to 714 of FIG. 7A or 758 of FIG. 7B.

In a further configuration, the reset information includes either a subset of a plurality of identifiers or an index that is for identifying the subset of the plurality of identifiers. The apparatus may further include means for receiving (e.g., 904) the plurality of identifiers. In one configuration, the means for receiving the plurality of identifiers performs the operations described above with regard to 702 of FIG. 7A. The apparatus may further include means for identifying (e.g., 906, 1004) the subset of the plurality of identifiers in response to receiving the reset information if the reset information includes the index. The plurality of identifiers may be arranged in a form of a matrix. The matrix may include a Latin square. The means for identifying (e.g., 906, 1004) may be configured to identify a particular column or a particular row of the matrix using the index. In one configuration, the means for identifying performs the operations described above with regard to 710 of FIG. 7A.

The apparatus may further include means for transmitting (e.g., 910, 1010) a request for a location service. The reset information may be received in response to the transmission of the request. In one configuration, the means for transmitting a request performs the operations described above with regard to 706 of FIG. 7A The aforementioned means may be one or more of the aforementioned components of the apparatus 902 and/or the processing system 1014 of the apparatus 902' configured to perform the functions recited by the aforementioned means. As described supra, the processing system 1014 may include the processor 1004. As such, in one configuration, the aforementioned means may be the processor 1004 configured to perform the functions recited by the aforementioned means.

Figure 11:
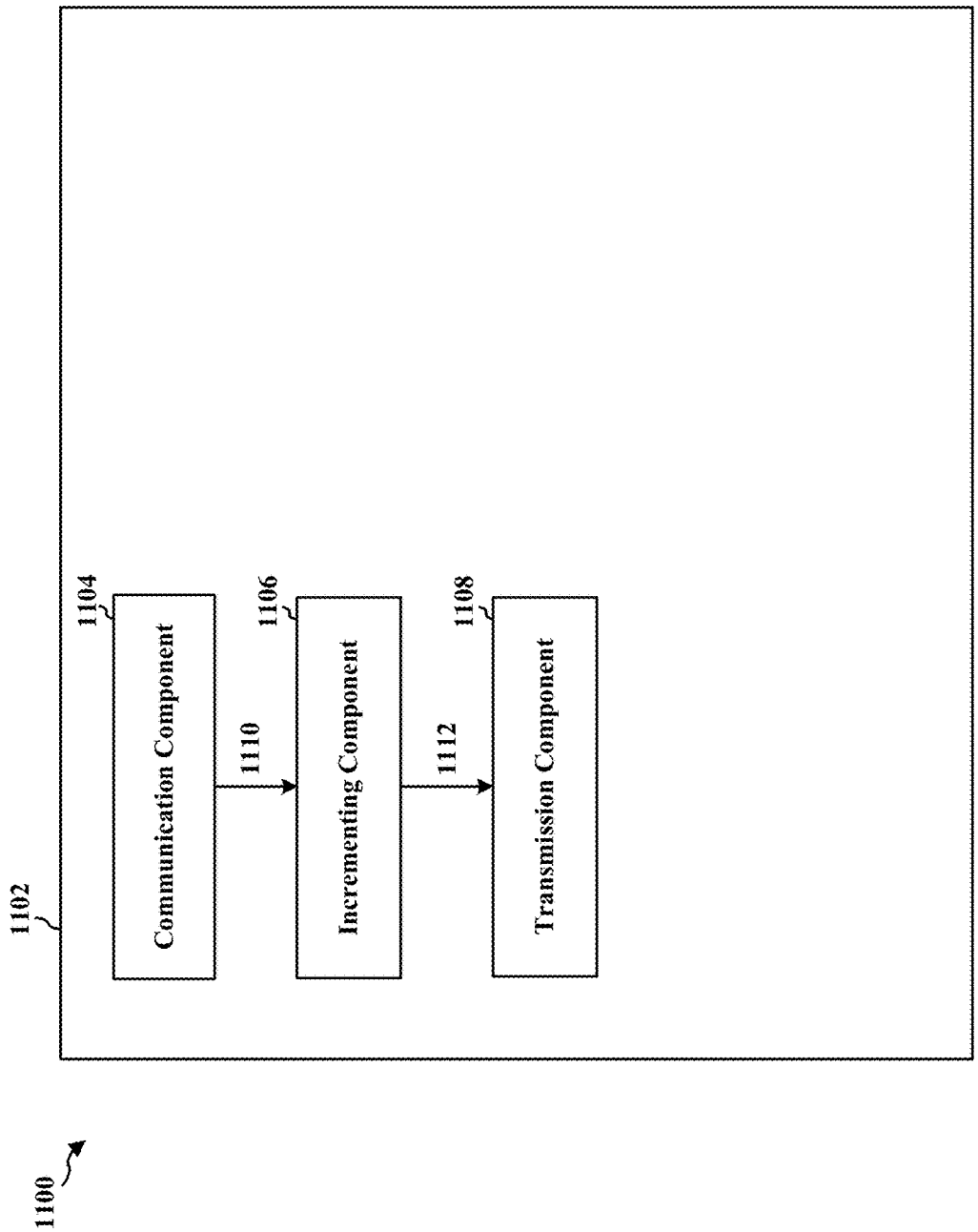
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a BMS server. The apparatus 1102 may include a communication component 1104. The communication component 1104 communicates a reset event to a plurality of stationary light fixtures. The communication causes at least one of the stationary light fixtures to align to a particular identifier of a respective sequence of identifiers.

The apparatus further includes an incrementing component 1106. The communication component 1104 outputs an indication 1110 to the incrementing component 1106 that the reset event is communicated. The incrementing component 1106 increments an index in response to the communicating.

The apparatus may further include a transmission component 1108. The incrementing component 1106 outputs the incremented index 1112 to the transmission component 1108. The transmission component 1108 transmits the incremented index to a service provider server. The transmission of the index facilitates communication of the incremented index to a user equipment (UE).

The apparatus may include additional components that perform each of the steps of the algorithm in the aforementioned flow charts of FIGS. 8A and 8B. As such, each step in the aforementioned flow charts of FIGS. 8A and 8B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
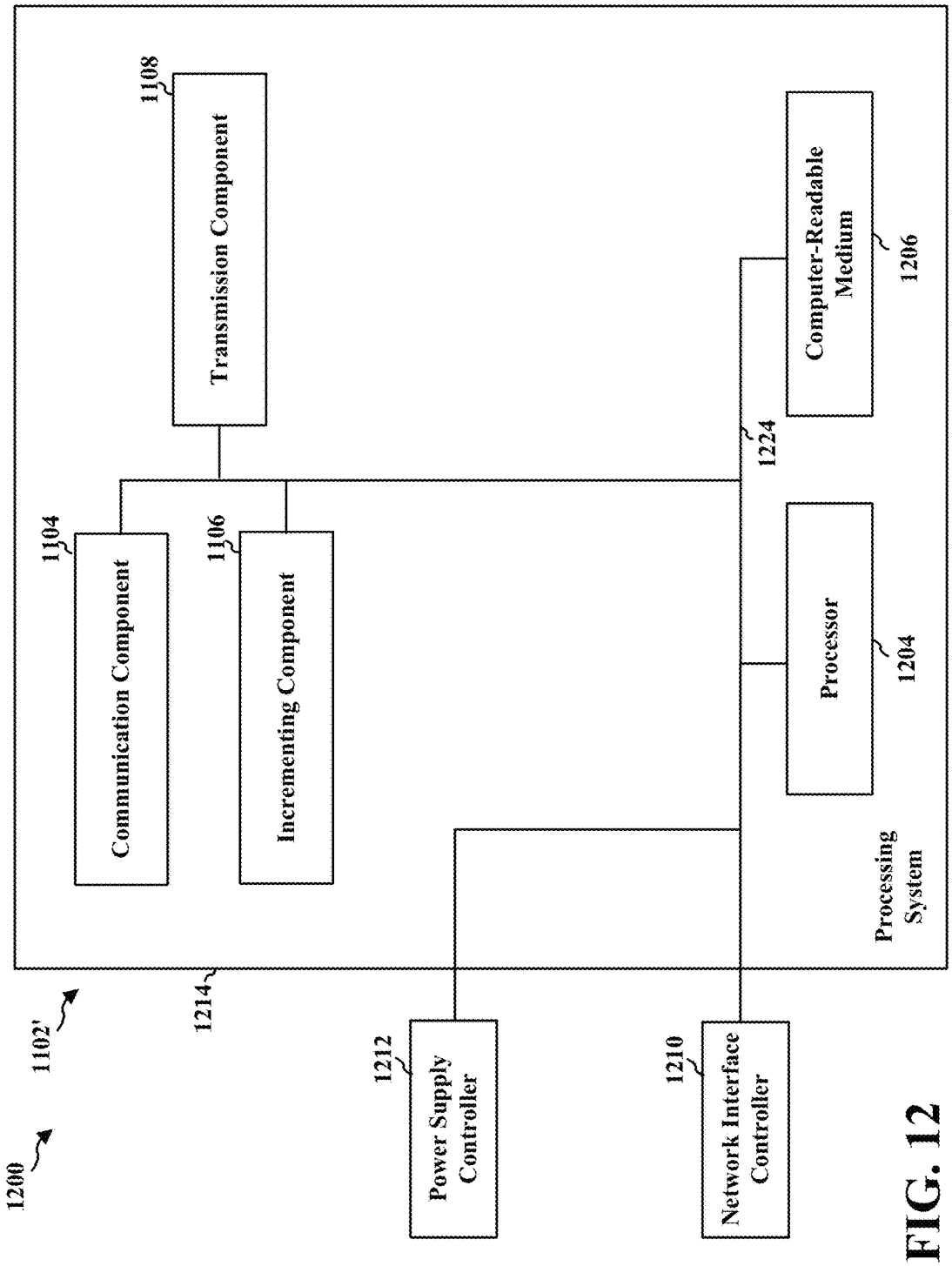
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106 and 1108 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a network interface controller (NIC) 1210. The NIC 1210 provides a means for communicating with various other apparatus over a computer network. The NIC 1210 receives a signal from the computer network, extracts information from the received signal, and provides the extracted information to the processing system 1214. In addition, the NIC 1210 receives information from the processing system 1214, specifically the transmission component 1108 and/or the communication component 1104, and based on the received information, generates a signal to be transmitted to the computer network.

The processing system 1214 may be coupled to a power supply controller 1212. The power supply controller 1212 provides a means for signaling a reset event to a light emitting apparatus by powering the light emitting apparatus OFF and ON according to a particular pattern or by supplying power according to a particular pattern of voltage amplitude. The power supply controller 1212 receives information from the processing system 1214, specifically the communication component 1104, and based on the received information, generates the particular pattern of power OFF and ON or voltage amplitude.

The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system may further include at least one of the components 1104, 1106 or 1108. The components may be software components running in the processor 1204, resident/stored in the computer readable medium/memory 1206, one or more hardware components coupled to the processor 1204, or some combination thereof.

In one configuration, the apparatus 1102/1102' includes means for communicating (e.g., 1104, 1204, or 1212) a reset event to a plurality of stationary light fixtures, to cause at least one stationary light fixture of the plurality of stationary light fixtures to align to a particular identifier of a respective sequence of identifiers. In one configuration, the means for communicating a reset event performs the operations described above with regard to 802 of FIG. 8A or 852 of FIG. 8B. The apparatus further includes means for incrementing (e.g., 1106, 1204) an index in response to the communicating. In one configuration, the means for incrementing an index performs the operations described above with regard to 804 of FIG. 8A or 854 of FIG. 8B. The apparatus may further include means for transmitting (e.g., 1108, 1210) the incremented index to a service provider server, to facilitate communication of the incremented index to a UE. In one configuration, the means for transmitting the incremented index performs the operations described above with regard to 806 of FIG. 8A.

In a further configuration, the communicating of the reset event causes transmission, by the at least one stationary light fixture, of the particular identifier via visible light.

In a further configuration, the means for communicating (e.g., 1104, 1204, or 1212) is configured to power off and on the plurality of stationary light fixtures concurrently according to a particular pattern. The particular pattern may be defined by a sequence of time durations over which the plurality of stationary light fixtures are powered on concurrently. The particular pattern may be defined by a number of power-off-to-power-on transitions. The particular pattern may be further defined by at least one time duration over which the plurality of stationary light fixtures are powered on concurrently.

In a further configuration, the means for communicating (e.g., 1104, 1204, or 1212) is configured to power the plurality of stationary light fixtures concurrently according to a particular pattern of voltage amplitudes.

In a further configuration, the means for communicating (e.g., 1104, 1204, or 1212) is configured to transmit a signal indicating an occurrence of the reset event. The signal may be transmitted over a wired connection or over a wireless radio frequency (RF) interface. For example, the signal may be transmitted over the wired connection using a Digital Addressable Lighting Interface (DALI) or a Digital Multiplex (DMX) protocol.

The respective sequence of identifiers at the at least one stationary light fixture may include a respective subset of a plurality of identifiers, and the plurality of identifiers may form a matrix. The matrix may include a Latin square. The respective subset of the plurality of identifiers at the at least one stationary light fixture may correspond to a respective column or a respective row of the matrix.

The aforementioned means may be one or more of the aforementioned components of the apparatus 1102 and/or the processing system 1214 of the apparatus 1102' configured to perform the functions recited by the aforementioned means. As described supra, the processing system 1214 may include the processor 1204. As such, in one configuration, the aforementioned means may be the processor 1204 configured to perform the functions recited by the aforementioned means.

Figure 13:
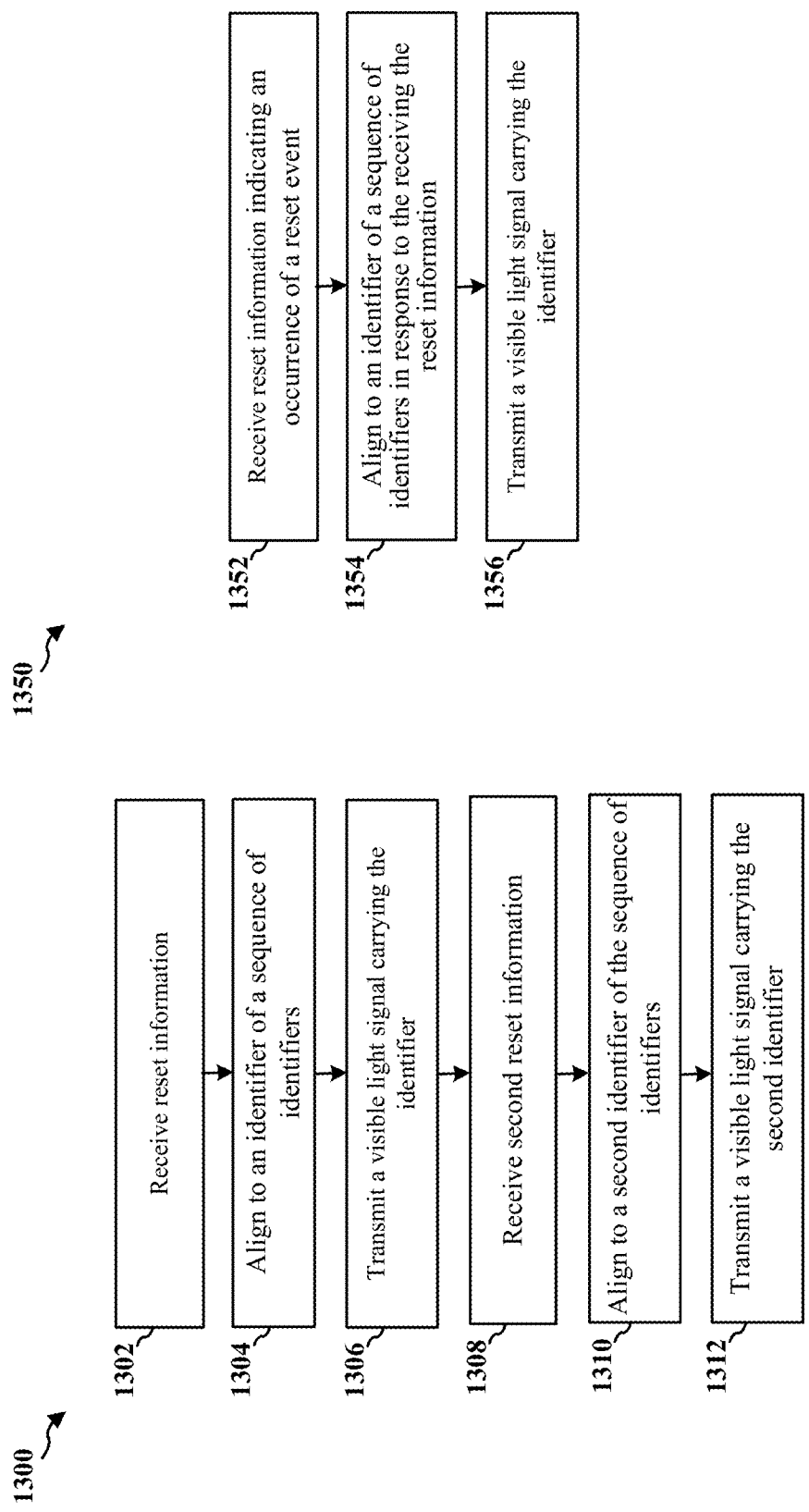
FIG. 13A is a flow chart of a method of operating a device.
FIG. 13B is a flow chart of a method of operating a device.

FIG. 13A is a flow chart 1300 of a method of operating a device. The device may be a stationary light fixture. At 1302, the device receives (e.g., using power detection circuit/sensor 1512 or reception component 1404) reset information. For example, with reference to FIG. 4, the light fixture 404 receives reset information from server 408.

The reset information may be received by receiving power and removal of the power according to a particular pattern (e.g., see pattern 500 of FIG. 5). For example, the particular pattern may be defined by a sequence of time durations over which power is received. As another example, the particular pattern may be defined by a number of power-off-to-power-on transitions. As a further example, the particular pattern may be further defined by at least one time duration over which power is received.

Alternatively, the reset information may be received by receiving power according to a particular pattern of voltage amplitudes. Alternatively, the reset information may be received by receiving a signal indicating the occurrence of the reset event. The signal may be received over a wired connection (e.g., using a DALI or a DMX protocol) or over a wireless RF interface.

At 1304, the device aligns (e.g., using processor 1504 or aligning component 1406) to a particular identifier of a respective sequence of identifiers. For example, the light fixture 404 may maintain a pointer or marker. The light fixture 404 may move the pointer or marker from a current position to a new position. The new position may correspond to an identifier in an adjacent entry in a row of matrix 310 that corresponds to the light fixture.

At 1306, the device may transmit (e.g., using light emitting unit 1510 or transmission component 1408) the identifier via visible light. For example, the light fixture 404 may transmit a visible light signal that carries the identifier.

At 1308, the device receives (e.g., using power detection circuit/sensor 1512 or reception component 1404) second reset information. For example, with reference to FIG. 4, the light fixture 404 receives second reset information from server 408.

At 1310, the device aligns (e.g., using processor 1504 or aligning component 1406) to a second particular identifier of the respective sequence of identifiers. For example, the light fixture 404 may align to a second identifier in a next adjacent entry in the row of matrix 310 that corresponds to the light fixture.

At 1312, the device may transmit (e.g., using light emitting unit 1510 or transmission component 1408) the second identifier via visible light. For example, the light fixture 404 may transmit a visible light signal that carries the second identifier.

FIG. 13B is a flow chart 1350 of a method of operating a device. The device may be a stationary light fixture. At 1352, the device receives (e.g., using power detection circuit/sensor 1512 or reception component 1404) reset information indicating an occurrence of a reset event. For example, with reference to FIG. 4, the light fixture 404 receives reset information from server 408.

The reset information may be received by receiving power and removal of the power according to a particular pattern (e.g., see pattern 500 of FIG. 5). For example, the particular pattern may be defined by a sequence of time durations over which power is received. As another example, the particular pattern may be defined by a number of power-off-to-power-on transitions. As a further example, the particular pattern may be further defined by at least one time duration over which power is received.

Alternatively, the reset information may be received by receiving power according to a particular pattern of voltage amplitudes. Alternatively, the reset information may be received by receiving a signal indicating the occurrence of the reset event. The signal may be received over a wired connection (e.g., using a DALI or a DMX protocol) or over a wireless RF interface.

At 1354, the device aligns (e.g., using processor 1504 or aligning component 1406) to a particular identifier of a respective sequence of identifiers in response to the receiving the reset information. For example, the light fixture 404 may maintain a pointer or marker. The light fixture 404 may move the pointer or marker from a current position to a new position. The new position may correspond to an identifier in an adjacent entry in a row of matrix 310 that corresponds to the light fixture.

At 1356, the device may transmit (e.g., using light emitting unit 1510 or transmission component 1408) the identifier via visible light. For example, the light fixture 404 may transmit a visible light signal that carries the identifier.

Figure 14:
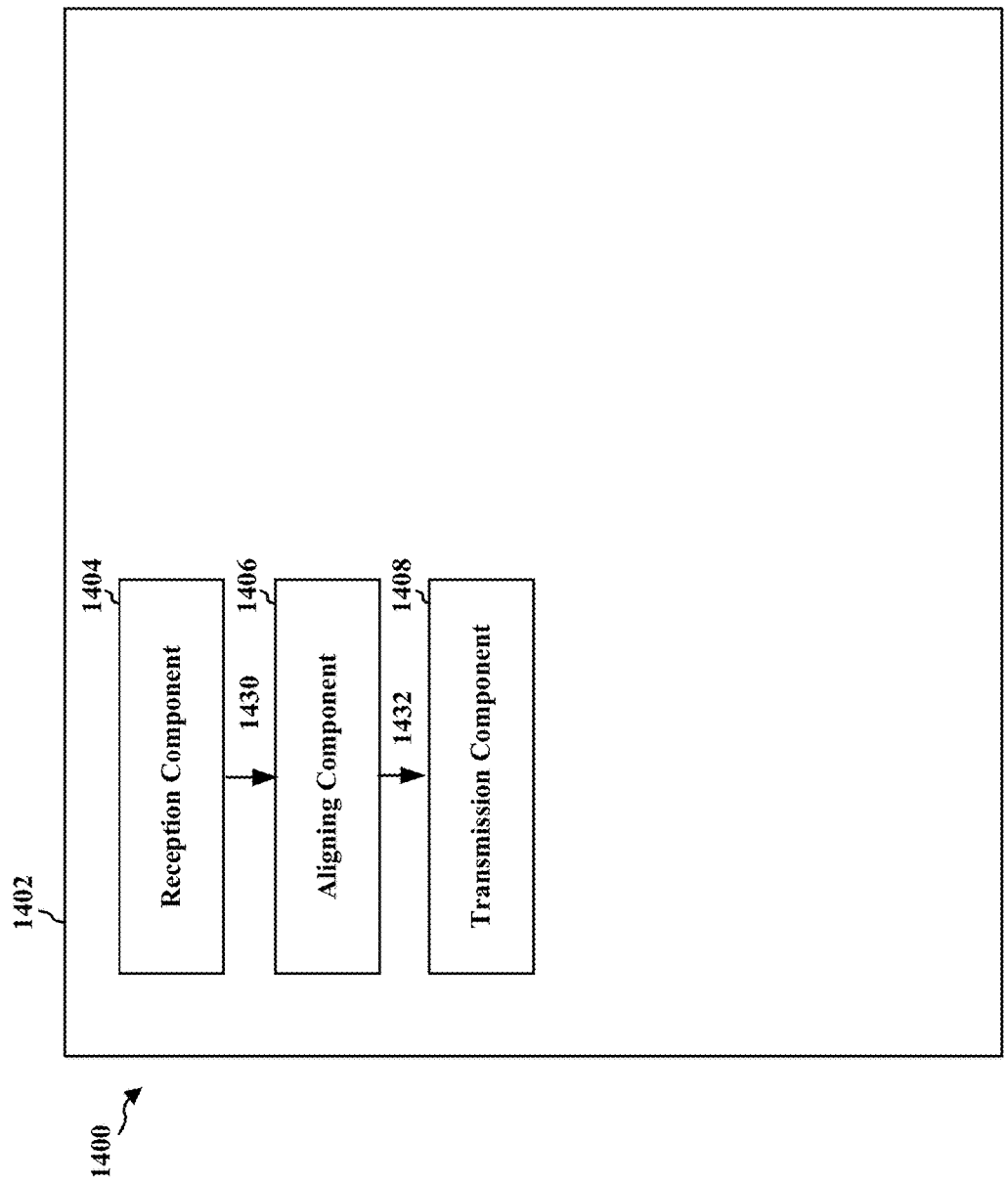
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a stationary light fixture. The apparatus 1402 may include a reception component 1404, an aligning component 1406 and a transmission component 1408.

The reception component 1404 receives reset information. The reception of the reset information is output to the aligning component 1406 as output 1430.

The aligning component 1406 aligns to an identifier of a sequence of identifiers in response to receiving the reset information. The identifier is output to the transmission component 1408 as output 1432.

The transmission component 1408 transmits a visible light signal carrying the identifier.

The apparatus may include additional components that perform each of the steps of the algorithm in the aforementioned flow charts of FIGS. 13A and 13B. As such, each step in the aforementioned flow charts of FIGS. 13A and 13B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
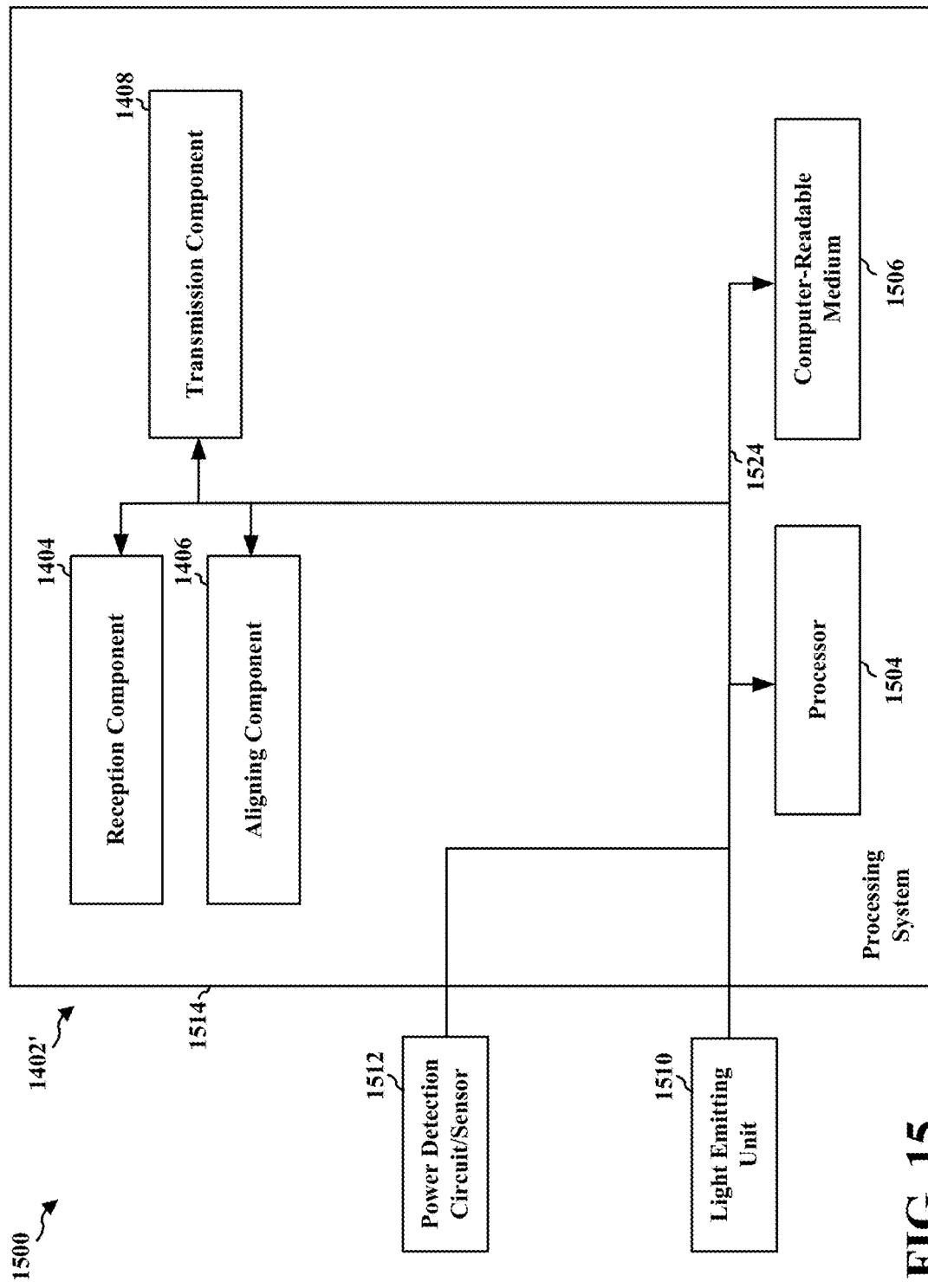
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406 and 1408 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a light emitting unit 1510. The light emitting unit 1510 may be a LED or any other light emitting device. The light emitting unit 1510 provides a means for communicating with various other apparatus via visible light. The light emitting unit 1510 receives information from the processing system 1514, specifically the transmission component 1408, and based on the received information, generates a VLC signal to be transmitted to other apparatus.

The processing system 1214 may be coupled to a power detection circuit/sensor 1512. The power detection circuit/sensor 1512 provides a means for receiving a reset event from a server by detecting a particular pattern of power OFF and ON or by detecting a particular pattern of voltage amplitude. The power detection circuit/sensor 1512 detects the particular pattern of power OFF and ON or voltage amplitude, extracts the reset event from the detected particular pattern, and provides the extracted reset event to the processing system 1514, specifically the reception component 1404.

The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the components 1404, 1406 or 1408. The components may be software components running in the processor 1504, resident/stored in the computer readable medium/memory 1506, one or more hardware components coupled to the processor 1504, or some combination thereof.

In one configuration, the apparatus 1502/1502' includes means for receiving (e.g., 1404, 1504, or 1512) reset information indicating an occurrence of a reset event. In one configuration, the means for receiving reset information performs the operations described above with regard to 1302, 1308 of FIG. 13A or 1352 of FIG. 13B. The apparatus further includes means for aligning (e.g., 1406, 1504) to an identifier of a sequence of identifiers in response to the receiving the reset information. In one configuration, the means for aligning performs the operations described above with regard to 1304, 1310 of FIG. 13A or 1354 of FIG. 13B. The apparatus further includes means for transmitting (e.g., 1408, 1504, or 1510) a visible light signal carrying the identifier. In one configuration, the means for transmitting a visible light signal performs the operations described above with regard to 1306, 1312 of FIG. 13A or 1356 of FIG. 13B.

The means for receiving (e.g., 1404, 1504, or 1512) may be configured to receive second reset information indicating an occurrence of a second reset event. The means for aligning (e.g., 1406, 1504) may be configured to align to a second identifier of the sequence of identifiers in response to the receiving the second reset information. The means for transmitting (e.g., 1408, 1504, or 1510) may be configured to transmit a visible light signal carrying the second identifier.

The means for receiving (e.g., 1404, 1504, or 1512) may be configured to receive the reset information by receiving power and removal of the power according to a particular pattern. The particular pattern may be defined by a sequence of time durations over which power is applied. The particular pattern may be defined by a number of power-off-to-power-on transitions. The particular pattern may be further defined by at least one time duration over which power is received.

The means for receiving (e.g., 1404, 1504, or 1512) may be configured to receive the reset information by receiving power according to a particular pattern of voltage amplitudes.

The means for receiving (e.g., 1404, 1504) may be configured to receive the reset information by receiving a signal indicating the occurrence of the reset event. The signal may be received over a wired connection or over a wireless radio frequency (RF) interface. For example, the signal may be received over the wired connection using a Digital Addressable Lighting Interface (DALI) or a Digital Multiplex (DMX) protocol The sequence of identifiers may include a subset of a plurality of identifiers, and the plurality of identifiers may form a matrix. The matrix may include a Latin square. The subset of the plurality of identifiers may correspond to a corresponding column or a corresponding row of the matrix.

The aforementioned means may be one or more of the aforementioned components of the apparatus 1402 and/or the processing system 1514 of the apparatus 1402' configured to perform the functions recited by the aforementioned means. As described supra, the processing system 1514 may include the processor 1504. As such, in one configuration, the aforementioned means may be the processor 1504 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of controlling a plurality of stationary light fixtures, comprising:
   communicating a reset event to the plurality of stationary light fixtures, from a server, to cause at least one stationary light fixture of the plurality of stationary light fixtures to align to a particular identifier of a respective sequence of identifiers; and
   incrementing an index, at the server, in response to the communicating.

2. The method of claim 1, wherein the communicating causes transmission, by the at least one stationary light fixture, of the particular identifier via visible light.

3. The method of claim 1, wherein the communicating comprises powering off and on the plurality of stationary light fixtures concurrently according to a particular pattern.

4. The method of claim 3, wherein the particular pattern is defined by a sequence of time durations over which the plurality of stationary light fixtures is powered on concurrently.

5. The method of claim 3, wherein the particular pattern is defined by a number of power-off-to-power-on transitions.

6. The method of claim 5, wherein the particular pattern is further defined by at least one time duration over which the plurality of stationary light fixtures are powered on concurrently.

7. The method of claim 1, wherein the communicating comprises powering the plurality of stationary light fixtures concurrently according to a particular pattern of voltage amplitudes.

8. The method of claim 1, wherein the communicating comprises transmitting a signal indicating an occurrence of the reset event.

9. The method of claim 8, wherein the signal is transmitted over a wired connection or over a wireless radio frequency (RF) interface.

10. The method of claim 1, further comprising:
    transmitting the incremented index to a service provider server, to facilitate communication of the incremented index to a user equipment (UE).

11. A device for controlling a plurality of stationary light fixtures, comprising:
    a power supply controller configured to communicate a reset event to the plurality of stationary light fixtures to cause at least one stationary light fixture of the plurality of stationary light fixtures to align to a particular identifier of a respective sequence of identifiers;
    a memory; and
    at least one processor coupled to the memory and configured to increment an index in response to the communicating.

12. The device of claim 11, wherein, to communicate, the power supply controller is configured to power off and on the plurality of stationary light fixtures concurrently according to a particular pattern.

13. The device of claim 12, wherein the particular pattern is defined by a sequence of time durations over which the plurality of stationary light fixtures is powered on concurrently.

14. The device of claim 12, wherein the particular pattern is defined by a number of power-off-to-power-on transitions.

15. The device of claim 11, wherein, to communicate, the power supply controller is configured to power the plurality of stationary light fixtures concurrently according to a particular pattern of voltage amplitudes.

16. The device of claim 11, further comprising a network interface controller configured to transmit a signal indicating an occurrence of the reset event.

17. The device of claim 11, further comprising a network interface controller configured to transmit the incremented index to a service provider server, to facilitate communication of the incremented index to a user equipment (UE).

18. An apparatus for controlling a plurality of stationary light fixtures, comprising:
    communication means for communicating a reset event to the plurality of stationary light fixtures to cause at least one stationary light fixture of the plurality of stationary light fixtures to align to a particular identifier of a respective sequence of identifiers; and
    increment means for incrementing an index in response to the communicating.

19. The apparatus of claim 18, wherein the communication means for communicating is configured to power off and on the plurality of stationary light fixtures concurrently according to a particular pattern.

20. The apparatus of claim 19, wherein the particular pattern is defined by a sequence of time durations over which the plurality of stationary light fixtures is powered on concurrently.

21. The apparatus of claim 19, wherein the particular pattern is defined by a number of power-off-to-power-on transitions.

22. The apparatus of claim 18, wherein the communication means for communicating is configured to power the plurality of stationary light fixtures concurrently according to a particular pattern of voltage amplitudes.

23. The apparatus of claim 18, wherein the communication means for communicating is configured to transmit a signal indicating an occurrence of the reset event.

24. The apparatus of claim 18, further comprising:
transmission means for transmitting the incremented index to a service provider server, to facilitate communication of the incremented index to a user equipment (UE).

25. A non-transitory computer-readable medium storing computer executable code for controlling a plurality of stationary light fixtures that when executed by a processor, causes the processor to perform the following operations:
communicating a reset event to the plurality of stationary light fixtures to cause at least one stationary light fixture of the plurality of stationary light fixtures to align to a particular identifier of a respective sequence of identifiers; and
incrementing an index in response to the communicating.

26. The computer-readable medium of claim 25, wherein the communicating comprises powering off and on the plurality of stationary light fixtures concurrently according to a particular pattern.

27. The computer-readable medium of claim 26, wherein the particular pattern is defined by a sequence of time durations over which the plurality of stationary light fixtures is powered on concurrently.

28. The computer-readable medium of claim 25, wherein the communicating comprises powering the plurality of stationary light fixtures concurrently according to a particular pattern of voltage amplitudes.

29. The computer-readable medium of claim 25, wherein the communicating comprises transmitting a signal indicating an occurrence of the reset event.

30. The computer-readable medium of claim 25, further causes the processor to perform operation:
transmitting the incremented index to a service provider server, to facilitate communication of the incremented index to a user equipment (UE).

* * * * *